(12) United States Patent
Xie et al.

(10) Patent No.: US 10,042,545 B2
(45) Date of Patent: *Aug. 7, 2018

(54) TOUCH INPUT IN A CIRCUIT BOARD

(71) Applicant: Microsoft Technology Licensing, LLC, Redmond, WA (US)

(72) Inventors: Xiaoyue Xie, Cambridge, MA (US); Rahul Marwah, Seattle, WA (US); John Jacob Nelson, Redmond, WA (US); Ivan Andrew McCracken, Sammamish, WA (US); David Otto Whitt, III, Sammamish, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/723,895

(22) Filed: Oct. 3, 2017

(65) Prior Publication Data
US 2018/0024720 A1    Jan. 25, 2018

Related U.S. Application Data

(63) Continuation of application No. 14/561,014, filed on Dec. 4, 2014, now Pat. No. 9,785,339.

(51) Int. Cl.
| | |
|---|---|
| G06F 3/0488 | (2013.01) |
| G06F 3/0354 | (2013.01) |
| G06F 1/16 | (2006.01) |
| G06F 3/044 | (2006.01) |

(52) U.S. Cl.
CPC ............ *G06F 3/0488* (2013.01); *G06F 1/169* (2013.01); *G06F 3/03547* (2013.01); *G06F 3/044* (2013.01)

(58) Field of Classification Search
CPC ...................................................... G06F 3/0488
USPC .......................................................... 345/173
See application file for complete search history.

(56) References Cited

U.S. PATENT DOCUMENTS

| | | | |
|---|---|---|---|
| 8,441,450 B2 | 5/2013 | Degner et al. | |
| 8,633,916 B2 | 1/2014 | Bernstein et al. | |
| 9,213,409 B2 | 12/2015 | Redelsheimer et al. | |
| 9,785,339 B2 * | 10/2017 | Xie | G06F 3/044 |

(Continued)

FOREIGN PATENT DOCUMENTS

| | | |
|---|---|---|
| WO | WO-2010039383 | 4/2010 |
| WO | WO-2014141443 | 9/2014 |

OTHER PUBLICATIONS

"Asus Zenbook UX21 Review", Retrieved From: <http://gadgetmix.com/asus-zenbook-ux21-review/> Aug. 21, 2014, Jun. 25, 2012, 3 Pages.

(Continued)

*Primary Examiner* — Fred Tzeng

(57) ABSTRACT

Techniques for a touch input in a circuit board are described. In at least some embodiments, a touch input device is integrated into a circuit board of an apparatus. For instance, a touch interaction region of the touch input device is formed by cutting and/or etching a portion of the circuit board such that the touch interaction region is moveable with respect to adjacent portions of the circuit board. According to one or more embodiments, a touch input device includes a switch such that movement of the touch interaction region actuates the switch to generate a click input event.

20 Claims, 19 Drawing Sheets

(56) References Cited

U.S. PATENT DOCUMENTS

| | | |
|---|---|---|
| 2010/0110016 A1 | 5/2010 | Ladouceur et al. |
| 2013/0050099 A1 | 2/2013 | Hirano et al. |
| 2013/0120258 A1 | 5/2013 | Maus |
| 2013/0222293 A1 | 8/2013 | Chung |
| 2014/0002113 A1 | 1/2014 | Schediwy et al. |
| 2014/0028573 A1 | 1/2014 | Olien et al. |
| 2014/0139442 A1 | 5/2014 | Clayton et al. |
| 2014/0247246 A1 | 9/2014 | Maus |
| 2015/0169005 A1 | 6/2015 | Yanagida |
| 2016/0162147 A1 | 6/2016 | Xie et al. |

OTHER PUBLICATIONS

"Final Office Action", U.S. Appl. No. 14/561,014, dated Oct. 19, 2016, 9 pages.
"International Preliminary Report on Patentability", Application No. PCT/US2015/062242, dated Sep. 21, 2016, 7 pages.
"International Search Report and Written Opinion", Application No. PCT/US2015/062242, dated Feb. 29, 2016, 12 Pages.
"Magic Trackpad", Retrieved From: <https://wvvvv.apple.com/magictrackpad/> May 14, 2014, Jul. 28, 2010, 3 Pages.
"Non-Final Office Action", U.S. Appl. No. 14/561,014, dated May 2, 2016, 9 pages.
"Notice of Allowance", U.S. Appl. No. 14/561,014, dated Jun. 6, 2017, 8 pages.
Topolsky,"New MacBook / MacBook Pro Unboxing and First Impressions", Retrieved From: <http://www.engadget.com/2008/10/14/new-macbook-macbook-pro-unboxing-and-first-impressions/> Aug. 21, 2014, Oct. 14, 2008, 9 pages.

\* cited by examiner

TOUCH INPUT IN A CIRCUIT BOARD

RELATED APPLICATIONS

This application is a continuation of and claims priority to U.S. patent application Ser. No. 14/561,014 entitled "Touch Input Device in a Circuit Board" and filed Dec. 4, 2014, the disclosure of which is incorporated by reference herein in its entirety.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Mobile devices today are manufactured according to a variety of different form factors. For example, a user may interact with a mobile phone, tablet computer, or other mobile computing device to check email, surf the web, compose texts, interact with applications, and so on. Further, mobile devices are being manufactured with increasingly thin and lightweight profiles, which creates challenges in designing and implementing input devices that provide a satisfactory user experience.

Techniques for a touch input in a circuit board are described. In at least some implementations, a touch input device (e.g., a touchpad, a trackpad, and so forth) is integrated into a printed circuit board assembly (PCBA) of an apparatus, such as a computing device, an input device (e.g., a keyboard), and so forth. For instance, a touch interaction region of the touch input device is formed by cutting and/or etching a portion of the circuit board such that the touch interaction region is moveable with respect to adjacent portions of the circuit board.

Implementations include a switch that is positioned relative to the touch interaction region such that movement of the touch interaction region actuates the switch to generate a click input event. In at least some implementations, the touch interaction region includes a sensor substrate that is configured to detect touch input to generate a touch input event. Thus, according to one or more implementations, a touch input device can enable multiple different types of input to be provided, such as click input via actuation of a switch, touch input to a touch input sensor, and so forth.

According to various implementations, integrating a touch input device into a circuit board conserves space within a device and reduces weight. For instance, a touch input device can be integrated into a main circuit board of a device, such as a circuit board that includes a central processing unit (CPU) and/or other components of a device. Thus, space is conserved and weight is reduced by not requiring additional space and additional components within a device chassis for a separate touch input device.

In the following discussion, an example environment is first described that may employ the techniques described herein. Implementations discussed herein, however, are not limited to the example environment. Next, a section titled "Example Orientations" describes some example device orientations in accordance with one or more implementations. Following this, a section titled "Example Implementations" describes example implementation scenarios for a touch input in a circuit board in accordance with one or more implementations. Finally, an example system and device are discussed that may implement various techniques described herein.

Example Environment

Figure 1:
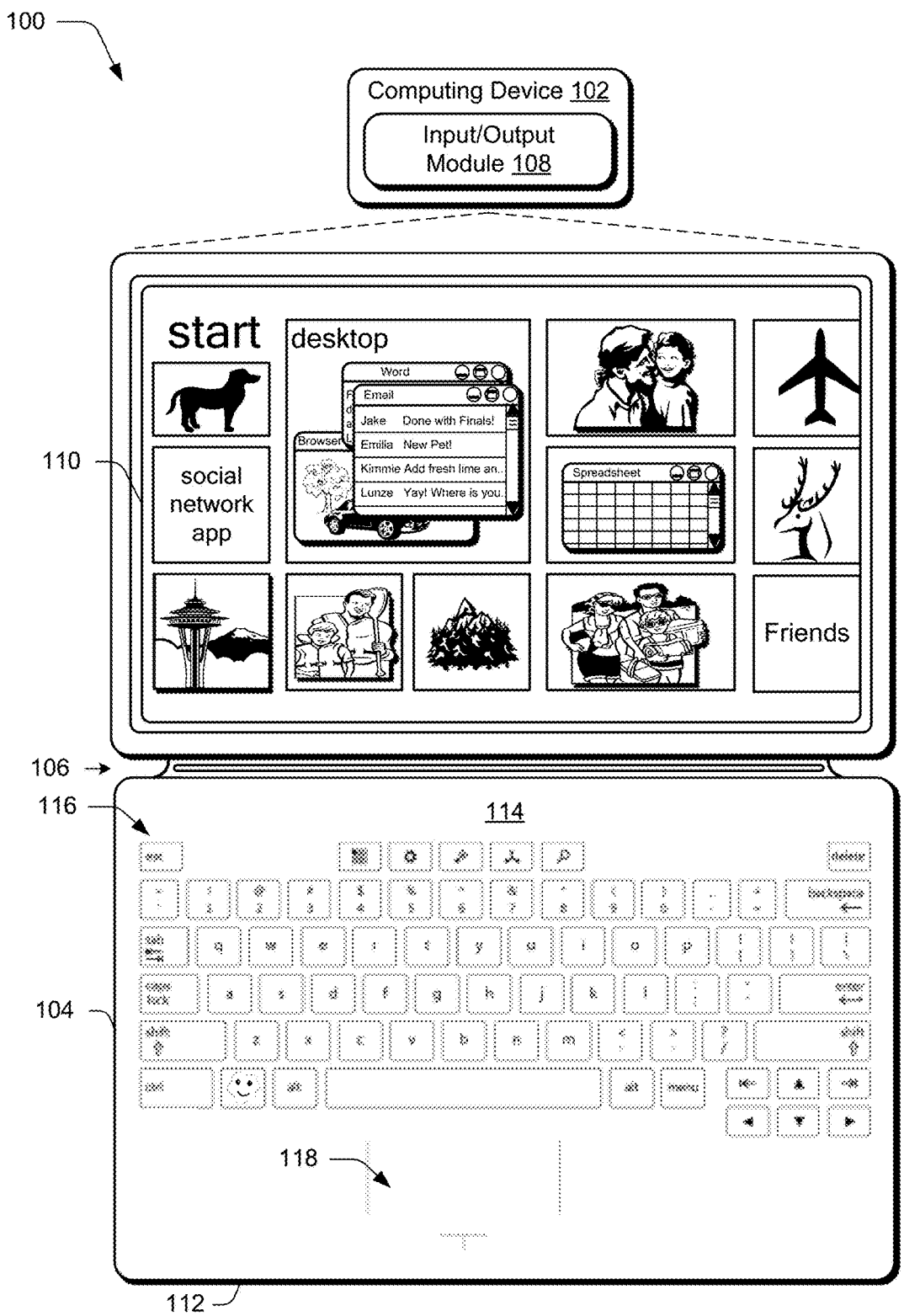
FIG. 1 is an illustration of an example environment that is operable to employ techniques described herein in accordance with one or more embodiments.

FIG. 1 is an illustration of an environment 100 in an example implementation that is operable to employ techniques for a touch input in a circuit board described herein. The illustrated environment 100 includes an example of a computing device 102 that is physically and communicatively coupled to an input device 104 via a flexible hinge 106. In this particular example, the computing device 102 is configured as a tablet computing device. This is not intended to be limiting, however, and the computing device 102 may be configured in a variety of other ways, such as a mobile phone, a wearable device, a desktop computing device, a gaming apparatus, and so on. Thus, the computing device 102 may range from full resource devices with substantial memory and processor resources, to a low-resource device with limited memory and/or processing resources. An example implementation of the computing device 102 is discussed below with reference to FIG. 20.

The computing device 102 is illustrated as including an input/output module 108, which is representative of functionality relating to processing of inputs and rendering outputs of the computing device 102. A variety of different inputs may be processed by the input/output module 108, such as inputs relating to functions that correspond to keys of the input device 104, keys of a virtual keyboard displayed by a display device 110 to identify touch gestures and cause operations to be performed that correspond to the touch gestures that may be recognized through the input device 104 and/or touchscreen functionality of the display device 110, and so forth. Thus, the input/output module 108 may support a variety of different input techniques by recognizing and leveraging a division between types of inputs including key presses, touch gestures, touchless gestures recognized via a camera functionality of the computing device 102, and so on.

In the illustrated example, the input device 104 is configured as having a chassis 112 with a top surface 114. Generally, the chassis 112 represents a body of the input device 104 (e.g., a frame) to which various components of the input device 104 can be mounted, attached, positioned, and so forth. The top surface 114 includes input portions that include a keyboard 116 having an arrangement of keys and a touch input device 118. The example arrangement is presented for purpose of example only, and other arrangements and positions for the keyboard 116 and the touch input device 118 are also contemplated. Further, other non-conventional configurations are also contemplated, such as a game controller, configuration to mimic a musical instrument, and so forth. Thus, the input device 104, the keyboard 116, and/or the touch input device 118 may assume a variety of different configurations to support a variety of different functionality. In the discussion herein, the touch input device 118 may alternately be referred to and/or implemented as a touch input sensor.

The touch input device 118 generally represents various types of input devices, such as a touchpad, a trackpad, and/or other device via which tactile input can be provided. For instance, a user may provide input to the touch input device using a finger, a stylus, a pen, and/or other instrument via which contact with the touch input device 118 may be provided.

Although the touch input device 118 is illustrated as being associated with other device components (e.g., the keyboard 116), this is not to be construed as limiting. For instance, in at least some implementations, the touch input device 118 may be implemented separately from the input device 104, such as a modular input device that may be communicatively coupled to a device via a wired and/or wireless connection. The touch input device 118, for instance, may be implemented as an external peripheral device that may be communicatively coupled and uncoupled from various different devices. Alternatively or additionally, the touch input device 118 may be implemented as a separate installable unit that may be manufactured separately from the input device 104. In such implementations, the touch input device 118 may be operably attached (e.g., soldered) to a variety of different devices to provide touch input functionality.

According to various implementations, the input device 104 is manufactured from a particular material, such as instances and/or combinations of plastic, metal, various alloys, carbon fiber, and so forth. Further, various portions of the top surface 114 may be laminated with a fabric layer. In at least some implementations, the entire top surface 114 is laminated with a fabric layer that covers the keyboard 116 and the touch input device 118. The fabric, for instance, may be a continuous sheet of fabric that is laminated to cover the top surface 114. According to one or more implementations, the fabric may include multiple individual layers of fabric material(s) that are laminated together to form an integrated fabric layer. This is not intended to be limiting, however, and in at least some implementations the top surface 114 is formed from and/or laminated with other types of material alternatively or additionally to fabric.

In one or more implementations, the touch input device 118 is mounted to the chassis 112 and can receive user input, such as via capacitive or other sensors that are configured to detect physical touch. As further detailed below, the touch input device 118 may be integrated into a primary printed circuit board assembly (PCBA) of the input device 104 in various ways.

As previously described, the input device 104 is physically and communicatively coupled to the computing device 102 in this example through use of a flexible hinge 106. The flexible hinge 106 is flexible in that rotational movement supported by the hinge is achieved through flexing (e.g., bending) of the material forming the hinge as opposed to mechanical rotation as supported by a pin, although that embodiment is also contemplated. Further, this flexible rotation may be configured to support movement in one or more directions (e.g., vertically in the figure) yet restrict movement in other directions, such as lateral movement of the input device 104 in relation to the computing device 102. This may be used to support consistent alignment of the input device 104 in relation to the computing device 102, such as to align sensors used to change power states, application states, and so on. In other implementations, flexible hinge 106 does not provide a communication connection and the input device 104 may rely on wireless communication to send and receive information to and from the computing device 102.

It is to be appreciated that the various devices and components illustrated in the accompanying drawings are not necessarily illustrated to scale. Thus, the various dimensions, positional relationships, and/or operational relationships between the different devices and components illustrated in the accompanying drawings are not to be construed as limiting on the claimed embodiments.

Have introduced the computing device 102, consider now a discussion of some example orientations of the computing device 102 in accordance with one or more implementations.

Example Orientations

Figure 2:
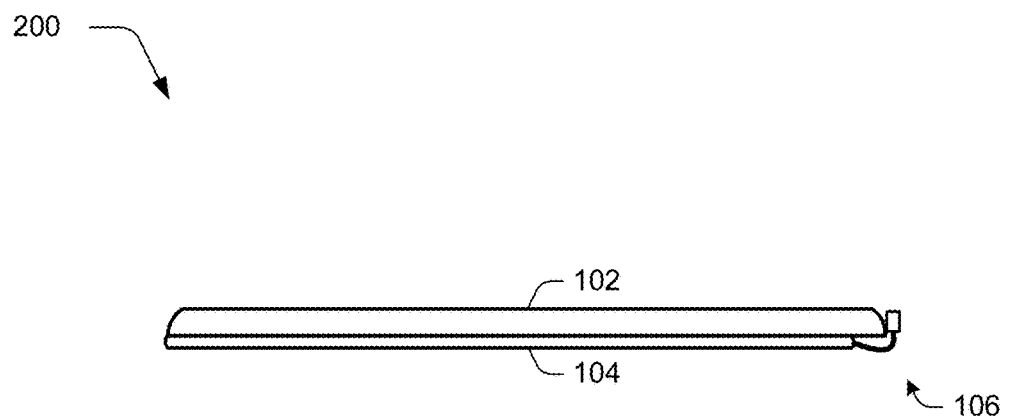
FIG. 2 depicts an example orientation a computing device in a closed position in accordance with one or more embodiments.

According to various embodiments, a variety of different orientations of the computing device 102 are supported. For example, rotational movement may be supported by the flexible hinge 106 such that the input device 104 may be placed against the display device 110 of the computing device 102 and thereby act as a cover as shown in the example orientation 200 of FIG. 2. Thus, the input device 104 may act to protect the display device 110 of the computing device 102 from harm.

Figure 3:
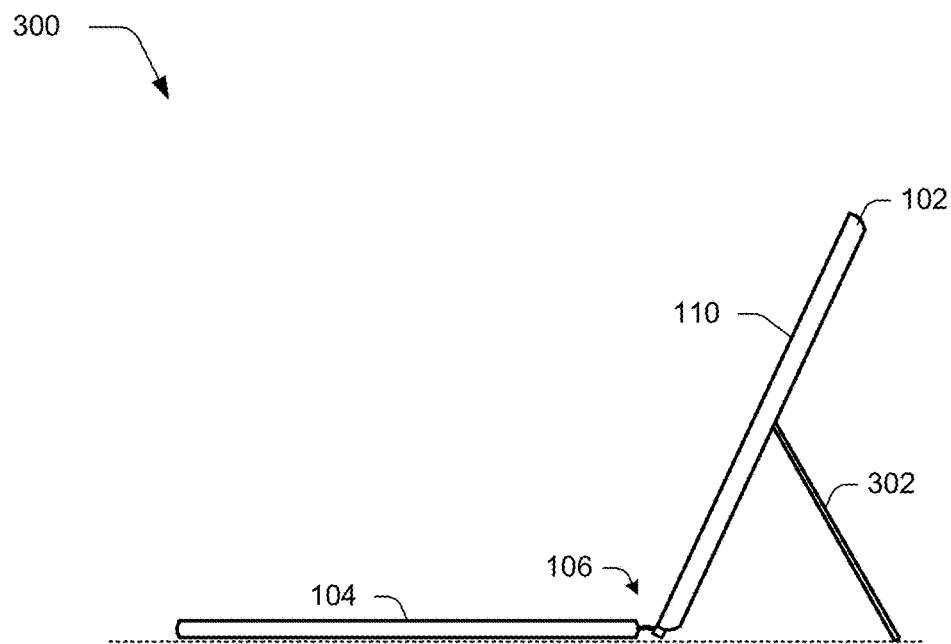
FIG. 3 depicts an example orientation a computing device in an open position in accordance with one or more embodiments.

As shown in the example orientation 300 of FIG. 3, a typing arrangement may be supported. In this orientation, the input device 104 is laid flat against a surface and the computing device 102 is disposed at an angle to permit viewing of the display device 110, e.g., such as through use of a kickstand 302 disposed on a rear surface of the computing device 102. Generally, the kickstand 302 represents a support component that enables a variety of different orientations for the computing device 102. The kickstand 302, for instance, is rotatably attached to the computing device 102 to enable the kickstand 302, and thus the computing device 102, to assume a variety of different orientations such that different operating scenarios are supported.

Naturally, a variety of other orientations other than those expressly illustrated and discussed herein are also supported.

Example Implementations

This section discusses some example implementations for a touch input in a circuit board in accordance with one or more implementations.

Figure 4A:
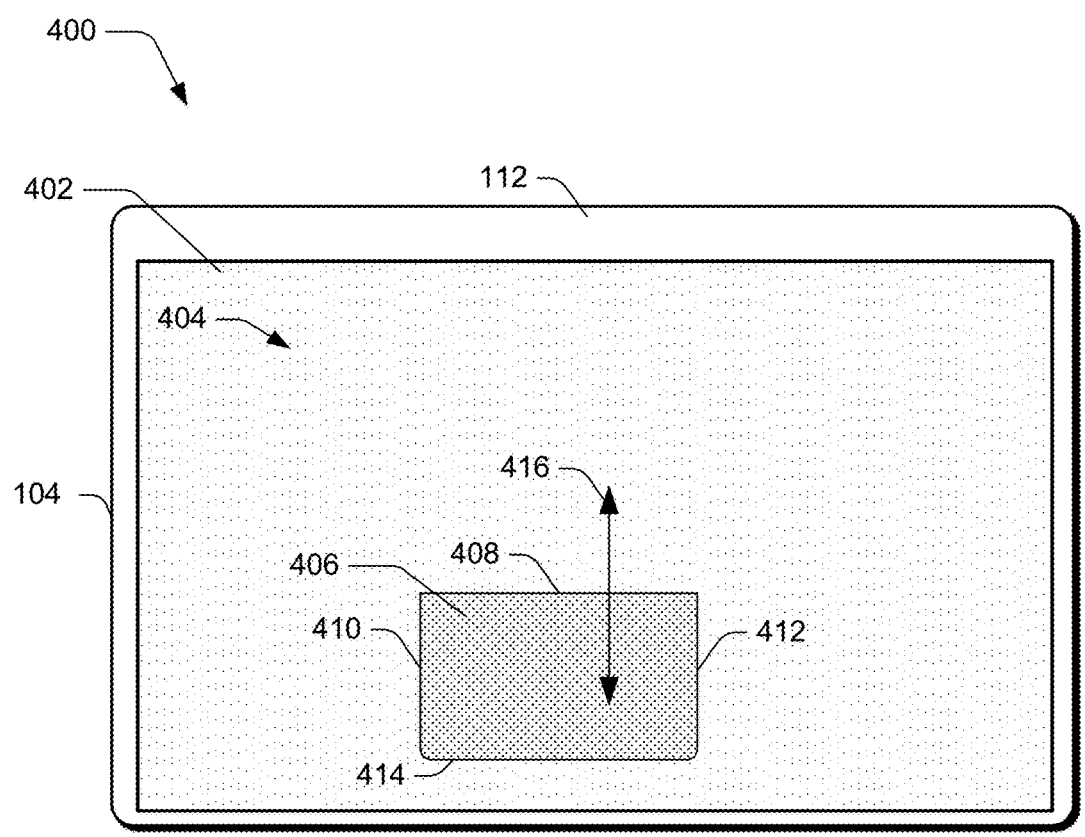
FIG. 4a depicts an example top view of an input device with a touch input device in accordance with one or more embodiments.

FIG. 4a illustrates a top view 400 of the input device 104 in accordance with one or more implementations. In the top view 400, the top surface 114 of the chassis 112 is removed to reveal a circuit board 402 of the input device 104. In at least some implementations, the circuit board is implemented as a PCBA. Generally, the circuit board 402 represents a portion of the input device 104 that mechanically supports and electrically connects various components of the input device 104. For instance, processing components (e.g., a microprocessor), storage components, Input/Output (I/O) components, and so forth, may be attached and/or electrically connected to the circuit board 402. The circuit board 402, for example, includes a keyboard region 404 that includes key sensors that detect user input to the keyboard 116 discussed above with reference to FIG. 1.

The circuit board 402 further includes a touch interaction region 406 that corresponds to a portion of the circuit board 402 in which various components of the touch input device 118 are mounted and/or positioned. The touch interaction region 406 includes a hinge region 408, a first side 410, a second side 412, and a third side 414. Generally, one or more of the first side 410, the second side 412, and/or the third side 414 may be cut and/or etched to enable hingeable movement of the touch interaction region 406 about the hinge region 408.

As further detailed below, the touch interaction region 406 represents a portion of the circuit board 402 that is etched and/or cut to allow for movement of the touch interaction region 406 relative to adjacent regions of the circuit board 402. Such movement of the touch interaction region 406 enables the touch input device 118 to be integrated into the circuit board 402 and provide a touch input interaction surface for the touch input device 118.

According to various implementations, an electrical connection 416 occurs across the hinge region 408 between the main body of the touch interaction region 406 and the main body of the circuit board 402. The electrical connection 416 enables electrical signal to be conducted between components attached to the touch interaction region 406 and other components, such as components attached at other regions of the circuit board 402 and/or the computing device 102. In various examples discussed below, portions of the hinge region 408 are etched and/or cut. In such implementations, it is to be appreciated that the electrical connection 416 persists such that electrical signal can be routed between components attached to the touch interaction region 406, and components external to the touch interaction region 406. For instance, wire traces within the circuit board 402 route electrical signal across the hinge region 408. Additionally or alternatively, conducting material such as wires and/or additional wire traces may be added to conduct electrical signal between components attached to the touch interaction region 406 and other components. Examples of such components are discussed below.

Figure 4B:
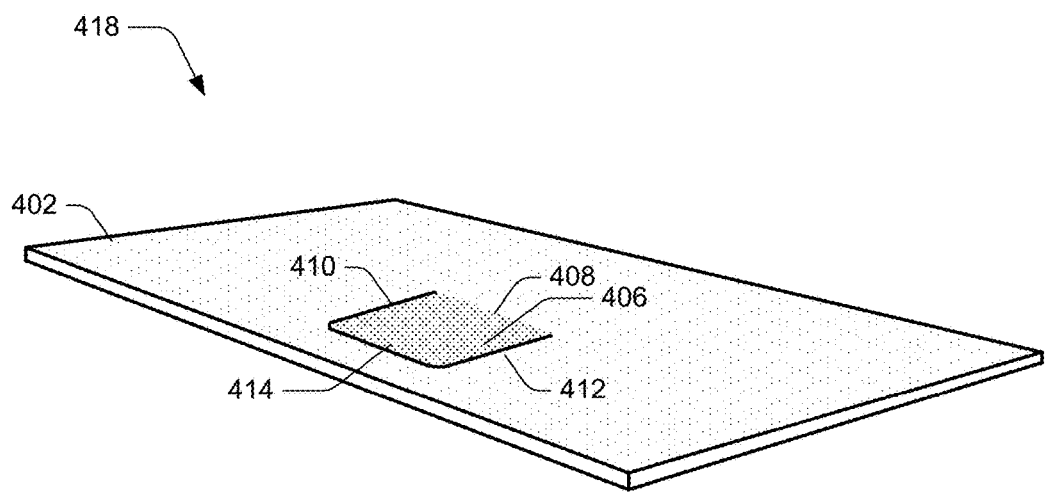
FIG. 4b depicts an example top view of a circuit board with a touch input device in accordance with one or more embodiments.

FIG. 4b illustrates a top view 418 of the circuit board 402 without other portions of the input device 104. The top view 418, for instance, illustrates the circuit board 402 prior to various components being attached to the circuit board 402 for installation into the input device 104. The top view 418 illustrates the touch interaction region 406, including the hinge region 408, the first side 410, the second side 412, and the third side 414. In the top view 418, the touch interaction region 406 is in a default position, e.g., a position in which a user is not interacting with the touch interaction region 406. Notice that in the top view 418, the touch interaction region 406 is coplanar with surrounding portions of the circuit board 402.

Figure 4C:
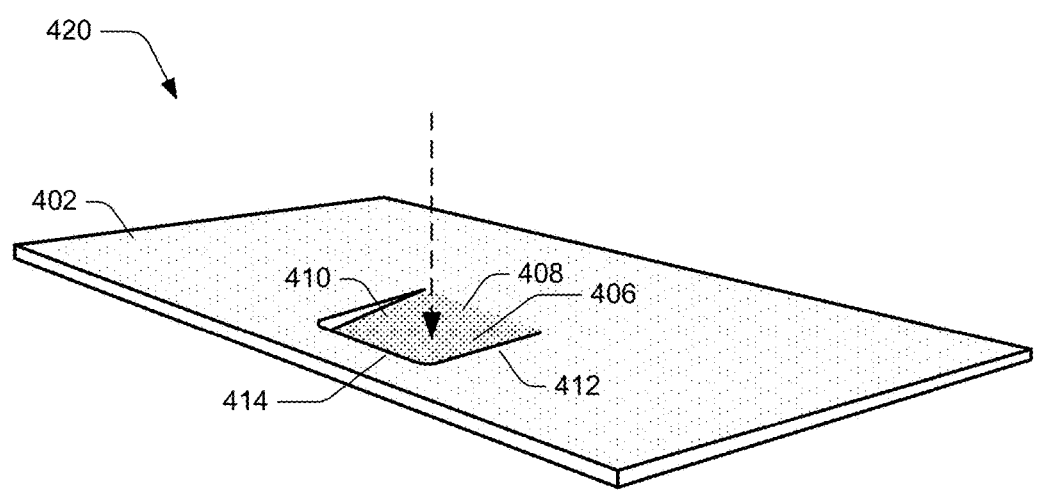
FIG. 4c depicts an example top view of a circuit board with a touch input device in accordance with one or more embodiments.

FIG. 4c illustrates a top view 420 of the circuit board 402 without other portions of the input device 104. In the top view 420, the touch interaction region 406 is deflected downward away from the plane of the circuit board 402. Deflection of the touch interaction region 406, for instance, occurs in response to a user pressing on the touch interaction region 406 with an input mechanism, such as a finger, a stylus, a pen, and so forth. Notice that in the top view 420, the touch interaction region 406 pivots downward about the hinge region 408. Further, the sides 410, 412, 414 move away from the plane of the circuit board 402 such that the touch interaction region 406 is no longer coplanar with surrounding portions of the circuit board 402. As further detailed below, this movement of the touch interaction region 406 allows input to be provided via interaction with the touch interaction region 406. In at least some implementations, movement of the touch interaction region 406 depicted in the top view 420 is exaggerated for purposes of illustration, and movement of the touch interaction region 406 experienced during a typical user input interaction may be significantly less than that shown in FIG. 4c.

Figure 5:
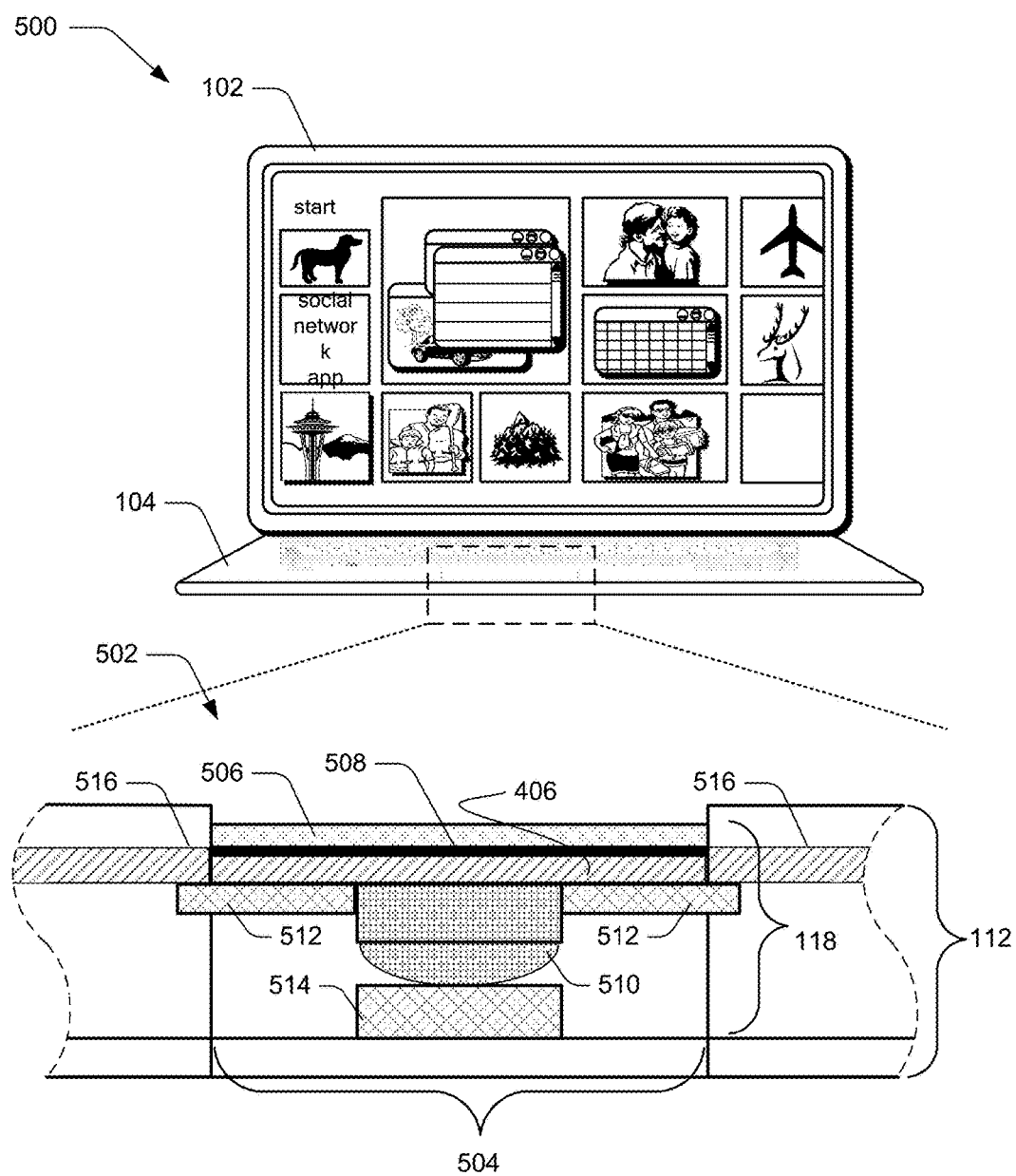
FIG. 5 depicts an example partial cross-section view of an input device in accordance with one or more embodiments.

FIG. 5 illustrates a front-facing view 500 of the computing device 102 and the input device 104. Further illustrated is a front section view 502 of the input device 104, which represents a partial cross-section of the input device 104 illustrating various components of the touch input device 118.

The section view 502 illustrates that components of the touch input device 118 that are attached to and/or positioned within a mounting cavity 504, which represents a portion of the chassis 112 that enables the touch input device 118 to be mounted within the input device 104. The touch input device 118 includes a face sheet 506 attached to a sensor substrate 508. Generally, the sensor substrate 508 represents a portion of the touch interaction region 406 of the circuit board 402 that is configured to receive touch input from a user and generate an input signal based on the touch input. The sensor substrate 508 may be implemented in various ways, such as a capacitive sensor region, a resistive sensor region, and so forth.

The face sheet 506 represents a material that is adhered to the sensor substrate 508. The face sheet 506 may be implemented using any suitable material, such as glass, ceramic, plastic, and so forth. According to various implementations, the face sheet 506 is constructed from a dielectric material that enables touch interaction with the face sheet 506 to be detected by the sensor substrate 508 to generate a touch input signal. Generally, the material used to form the face sheet 506 is selected to provide stiffening of the touch interaction region 406. A stiffer face sheet provides an improved user interaction with the touch input device 118 because it may provide a more stable input surface to receive a downward force characteristic of a click input. Further, the material used to form the fact sheet 506 is selected to have a low coefficient of friction so that user input in the form of cursor movement or gesture is easier for the user to perform. The face sheet 506 may be adhered to the sensor substrate 508 using any suitable adhesive and/or adhesive technique, such as a pressure sensitive adhesive (PSA), a heat activated adhesive, a contact adhesive, a multi-part adhesive, and so forth.

Attached to the opposite side of the touch interaction region 406 from the face sheet 506 are a switch 510 and a stopper 512. Generally, the switch 510 represents a way of generating input via the touch input device 118 that is different than that provided by the sensor substrate 508. In at least some implementations, the switch 510 may be adhered, soldered, and/or mechanically attached to the touch interaction region 406. Further details concerning the switch 510 are provided below.

Figure 12:
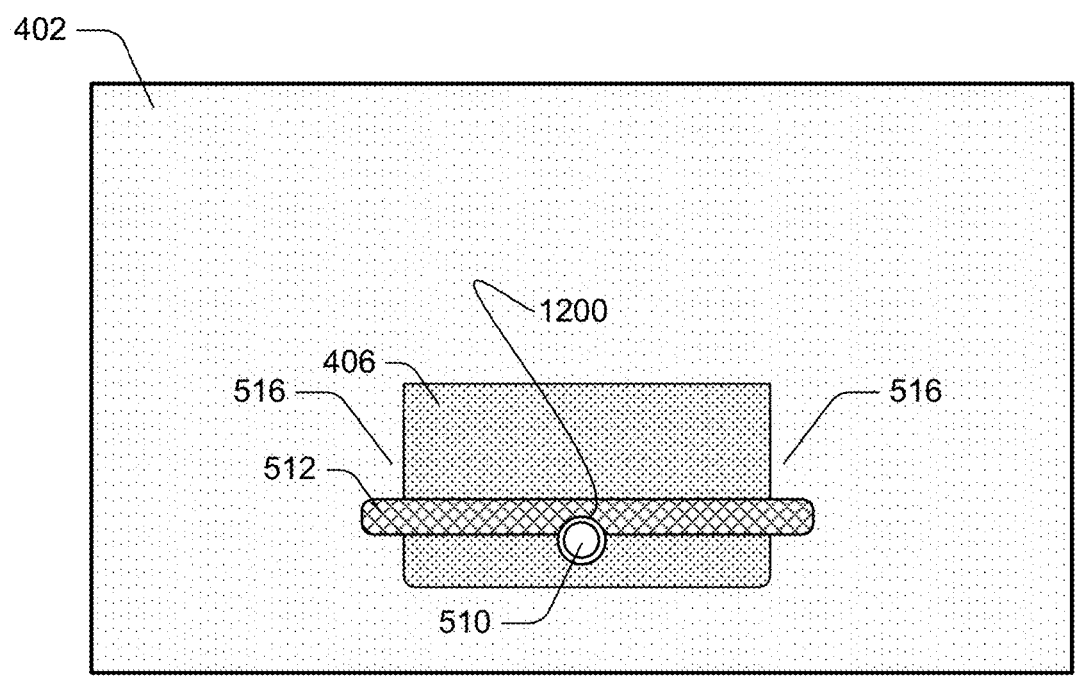
FIG. 12 depicts an underside view of a circuit board in accordance with one or more embodiments.

The stopper 512 represents a structure that restrains movement of various components of the touch input device 118, and that provides stiffening of the touch interaction region 406 during user interaction with the touch interaction region 406. The stopper 512 may be formed from any suitable material, such as metal, plastic, carbon fiber, alloys, and/or combinations thereof. According to various implementations, the stopper 512 may be attached to the touch interaction region 406 using any suitable attachment and/or adhesive technique. Due to the perspective presented in the section view 502, the stopper 512 is illustrated as two separate portions. As illustrated in FIG. 12, however, the stopper 512 generally represents a single integrated structure that provides both stopper and stiffener functionality to the touch input device 118.

Fastened to a bottom portion of the mounting cavity 504 is a switch step 514, which is representative of a structure that resides beneath the switch 510 in the mounting cavity 504. As further discussed below, movement of the switch 510 downward against the switch step 514 causes actuation of the switch 510 to generate an input event.

According to various implementations, the touch input region 406 of the circuit board 402 is surrounded by adjacent portions 516 of the circuit board 402. Generally, the adjacent portions 516 represent portions of the circuit board 402 that may be separated from the touch input region 406 in various ways, such as by cutting, etching, and so forth.

Figure 6:
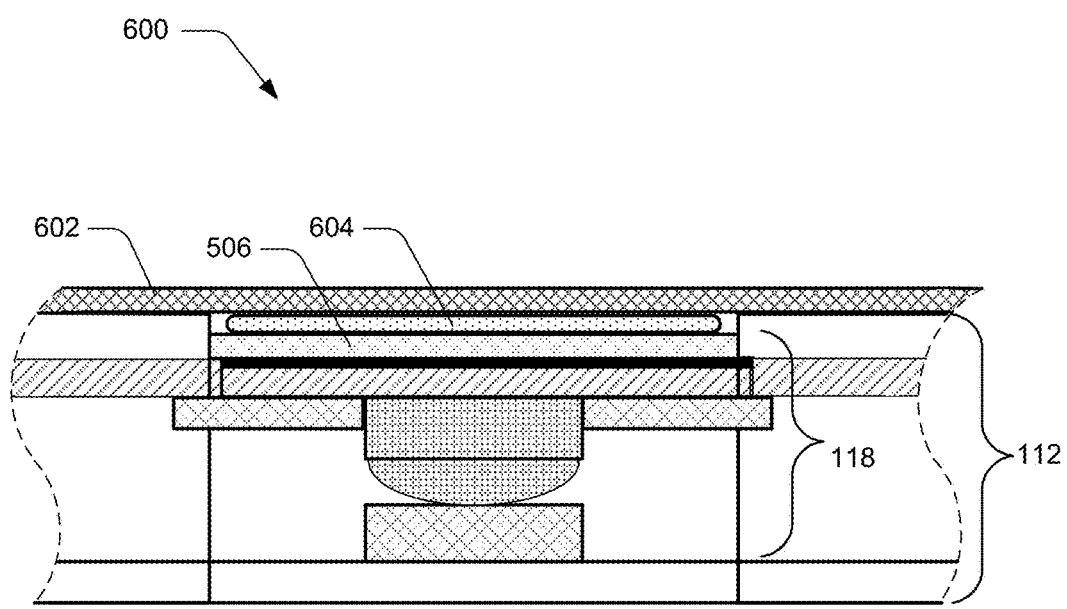
FIG. 6 depicts an example front section view of an input device in accordance with one or more embodiments.

FIG. 6 illustrates a front section view 600 of the input device 104, which represents a partial cross-section of the input device 104 illustrating various components of the touch input device 118. Generally, the front section view 600 represents a variation of the front section view 502 introduced above.

In the front section view 600, a fabric layer 602 is laminated over the chassis 112 and the face sheet 506. The fabric layer 602 may be laminated using any suitable adhesive and/or adhesive technique, examples of which are discussed above. In this particular example, the fabric layer 602 is laminated to the face sheet 506 via an adhesive layer 604, which may be formed from any suitable adhesive. Thus, in at least some implementations, the input device 104 including the touch input device 118 may be laminated with fabric, thus enabling touch input to be provided to the touch input device 118 via interaction with a portion of the fabric layer 602 that overlays the touch input device 118. While some implementations are discussed herein without specific reference to and/or illustration of the fabric layer 602, it is to be appreciated that such implementations may similarly and/or equally apply to fabric-layered scenarios.

Figure 7:
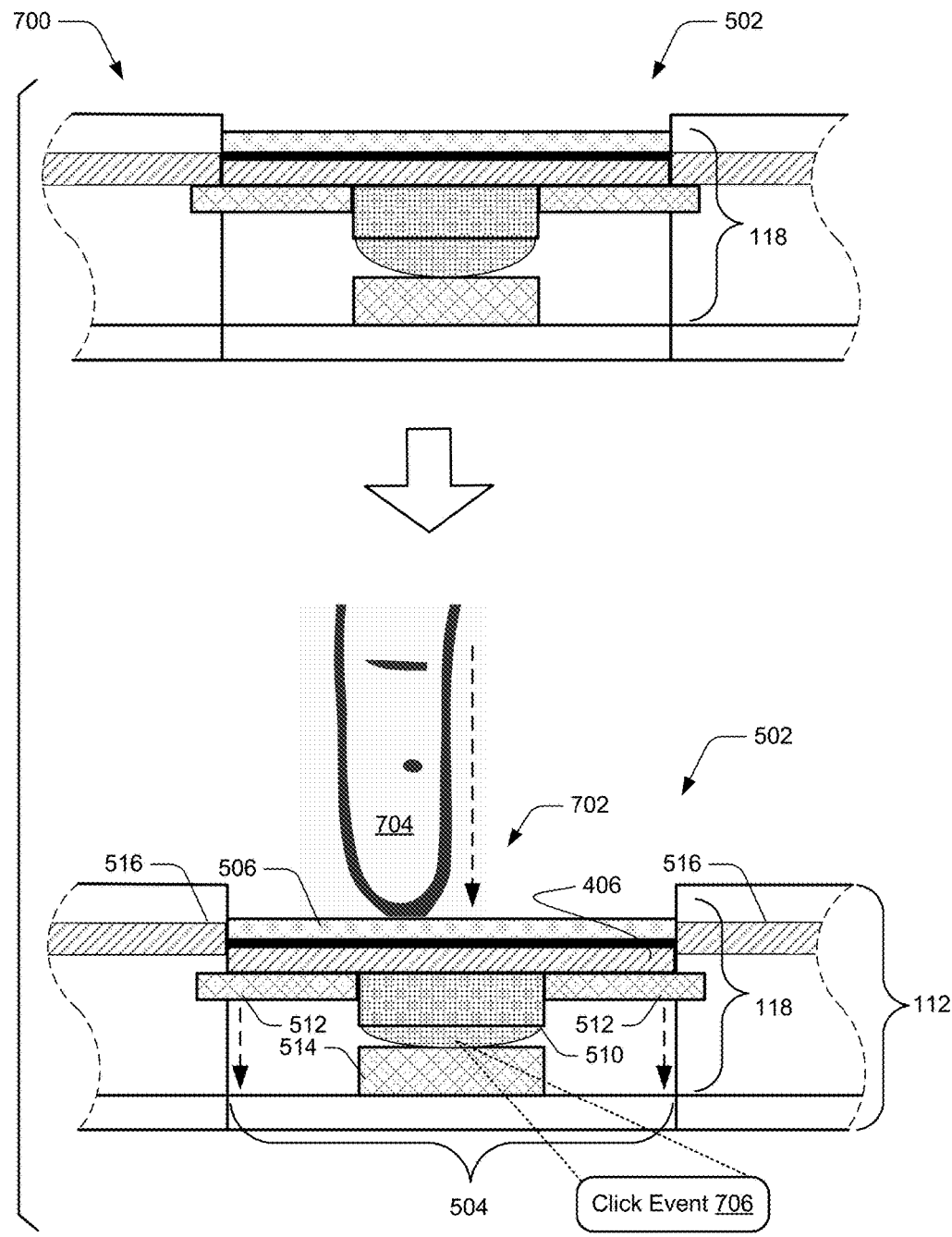
FIG. 7 illustrates an example implementation scenario for interacting with a touch input device in accordance with one or more embodiments.

FIG. 7 illustrates an example implementation scenario 700 for interacting with the touch input device 118 in accordance with one or more implementations. The upper portion of the scenario 700 includes the front section view 502 of the input device 104 introduced above with reference to FIG. 5, and various components of the touch input device 118 introduced above.

Proceeding to the lower portion of the scenario 700, a user provides a touch interaction 702 to the touch input device 118 via a finger 704. The user, for instance, applies downward force to the face sheet 506. Pressure from the touch interaction 702 applies pressure to components of the touch input device 118 and thus the touch input device 118 moves downward within the mounting cavity 504. Notice that as part of the movement of the touch input device 118, the touch interaction region 406 of the circuit board 402 deflects downward with respect to the adjacent portions 516 of the circuit board 402. For instance, in response to the touch input 702, the face sheet 506, the touch interaction region 406, the switch 510, and the stopper 512 move together as an integrated unit, whereas the adjacent portions 516 of the circuit board 402 do not move, or move a lesser distance downward than does the touch interaction region 406.

Accordingly, movement of the switch 510 downward compresses the switch 510 against the switch step 514 to actuate the switch 510 and generate a click event 706. For instance, compressing the switch 510 past a threshold compression distance within the mounting cavity 504 causes the switch 510 to "click" and generate the click event 706.

According to various implementations, actuation of the switch 510 is associated with a threshold force that is applied to the touch interaction region 406 via touch input to the face sheet 506. In the scenario 700, for example, the touch interaction 702 exceeds the threshold force, and thus the switch 510 is actuated to generate the click event 706. If, however, a touch interaction with the touch input device 118 does not exceed the threshold force, the switch 510 is not actuated and thus the click event 706 is not generated.

The click event 706 generally represents an input event that can be communicated to various functionalities of the computing device 102. Examples of the click event 706 include a selection event (e.g., to select a control displayed on an associated computing device), a power-related event (e.g., to switch between different device power states), a notification event (e.g., to communicate a notification to an entity and/or functionality), and so forth. In at least some implementations, actuating the switch 510 causes the switch 510 to generate an audible "click" and/or "snap" that indicates that the click event 706 is generated.

According to one or more implementations, the switch 510 includes an elastic mechanism (e.g., a spring, an elastic material, and so forth) that applies positive downward pressure against an adjacent surface. For instance, in this particular implementation, the switch 510 is attached to the touch interaction region 406, and thus applies pressure upon the switch step 514.

In an alternative implementation, the switch 510 may be attached to a bottom portion of the mounting cavity 504 (e.g., to the switch step 514), and not to the touch interaction region 504. In such an implementation, the elastic mechanism of the switch 510 may apply upward pressure against the touch interaction region 406. Accordingly, to cause the switch 510 to generate the click event 706, a user applies pressure against the upward and/or downward pressure applied by the switch 510 to cause the switch 510 to compress and generate the click event 706.

According to various implementations, the stopper 512 provides stiffening of the touch input device 118 during the touch input 702. For instance, the stopper 512 represents a stabilizer bar that mitigates uneven movement of the touch interaction region 406 during the touch input 702, and thus provides a more stable user experience for interaction with the touch input device 118.

Thus, according to one or more implementations, the layering of the various components of the touch input device 118 provides a moveable component stack that responds to user input in a variety of ways.

Figure 8:
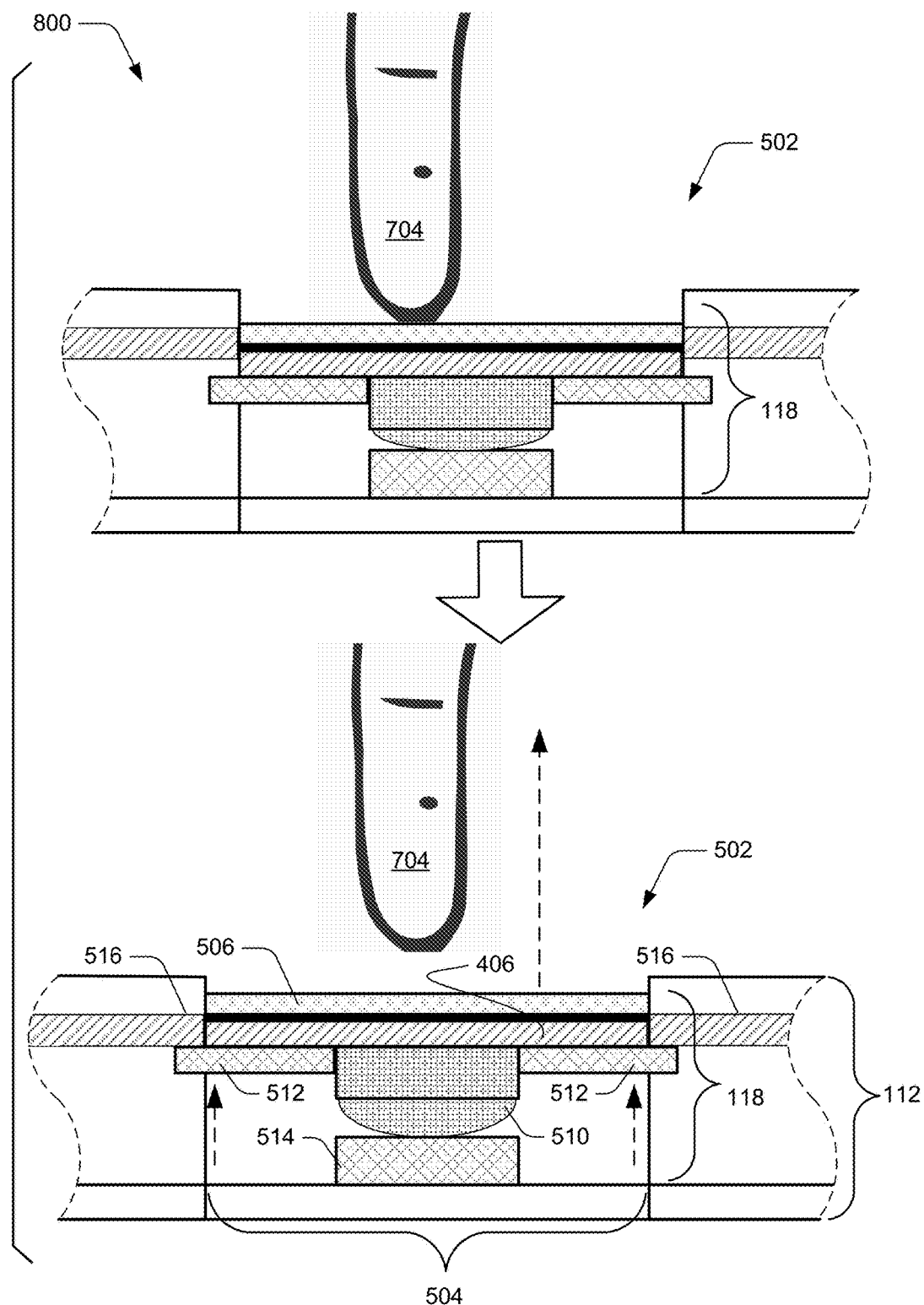
FIG. 8 illustrates an example implementation scenario for interacting with a touch input device in accordance with one or more embodiments.

FIG. 8 illustrates an example implementation scenario 800 for interacting with the touch input device 118 in accordance with one or more implementations. The upper portion of the scenario 800 includes the side section view 502 of the input device 104 and various components of the touch input device 118. Further illustrated is that the switch 510 is compressed such that the switch 510 is actuated, e.g., as discussed above with reference to FIG. 7.

Proceeding to the lower portion of the scenario 800, the user lifts their finger 704 such that pressure is released from the touch input device 118. Accordingly, spring pressure from the switch 510 pushes the components of the touch input device 118 upward within the mounting cavity 504 such that the touch input device 118 returns to a default position, e.g., a resting position in which a user is not interacting with the touch input device 118.

As referenced above, the switch 510 includes an elastic mechanism (e.g., a spring, an elastic material, and so forth) that applies positive pressure. Thus, when a user releases pressure from the face sheet 506, the switch 510 pushes the touch input device 118 upward to return to a default position.

Further illustrated in the scenario 800 is that the stopper 512 serves to stop upward movement of the touch input device 118 when the touch input device 118 returns to its default position. For instance, pressure from the switch 510 pushes the touch input device 118 upward within the mounting cavity 504 until the stopper 512 contacts the adjacent portions 516 of the circuit board 402, which stops movement of the touch input device 118. Thus, contact between the stopper 512 and the adjacent portions 516 prevent further upward movement of the touch input device 118 within the mounting cavity 504. According to various implementations, this prevents components of the touch input device 118 from becoming dislodged from the chassis 112 of the input device 104.

With the stopper 512 positioned against the adjacent portions 516, the switch 510 continues to exert pressure against the switch step 514. For instance, the touch input device 118 is assembled such that in a resting position (e.g., a default position), the switch 510 is slightly compressed against the switch step 514. Thus, the switch 510 may be assembled within the touch input device 118 to be preloaded with a certain force against the switch step 514 to mitigate "empty travel," which is a situation in which the touch input device 118 is moving without little or no countervailing force to slow or resist the movement during a user interaction with the touch input device 118.

Figure 9:
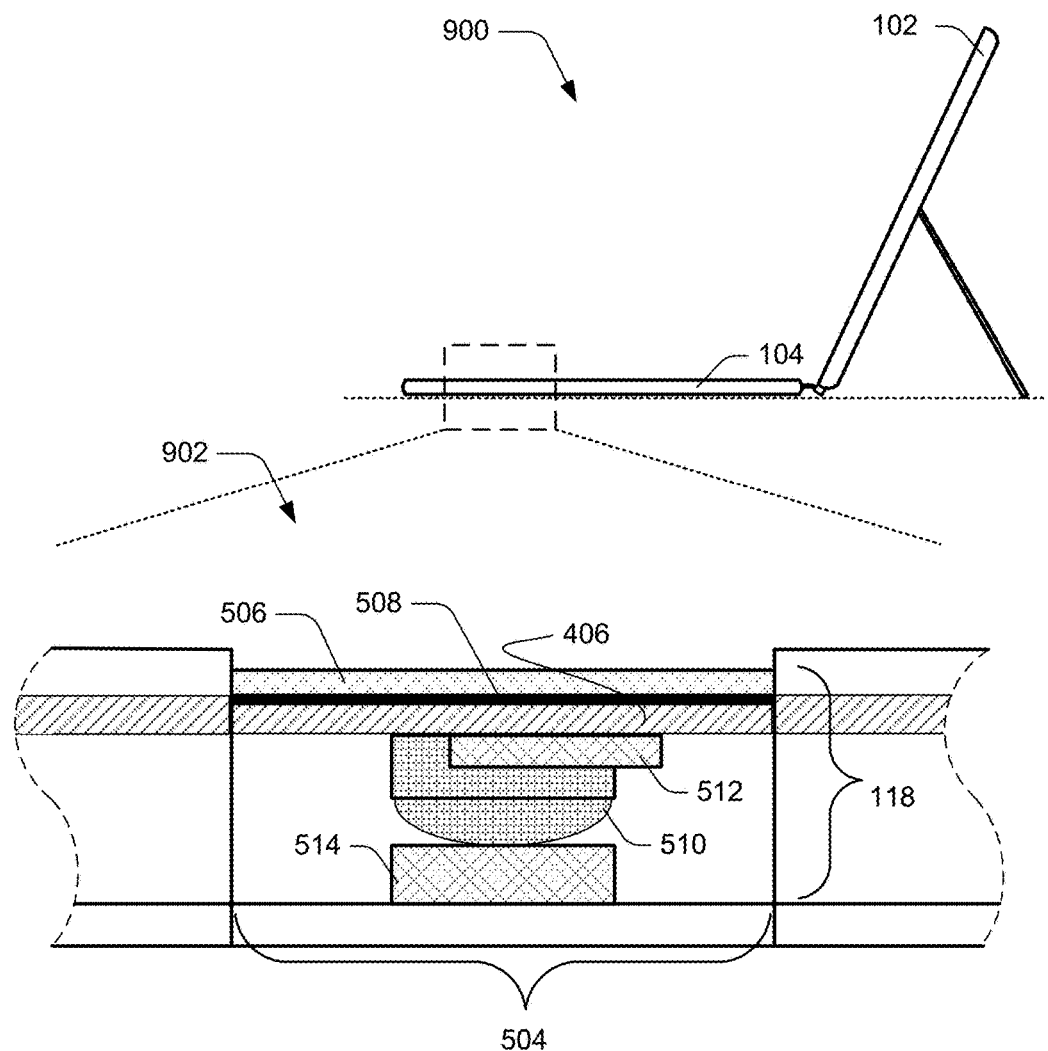
FIG. 9 depicts an example side section view of a touch input device in accordance with one or more embodiments.

FIG. 9 illustrates a side-facing view 900 of the computing device 102 and the input device 104. Further illustrated is a side section view 902 of the input device 104, which represents a partial cross-section of the input device 104 illustrating various components of the touch input device 118. For instance, the side section view 902 illustrates the face sheet 506 laminated to the sensor substrate 508 of the touch interaction region 406. Further illustrated are the switch 510, the stopper 512, and the switch step 514. Various other components of the input device 104 and the touch input device 118 are illustrated.

Figure 10:
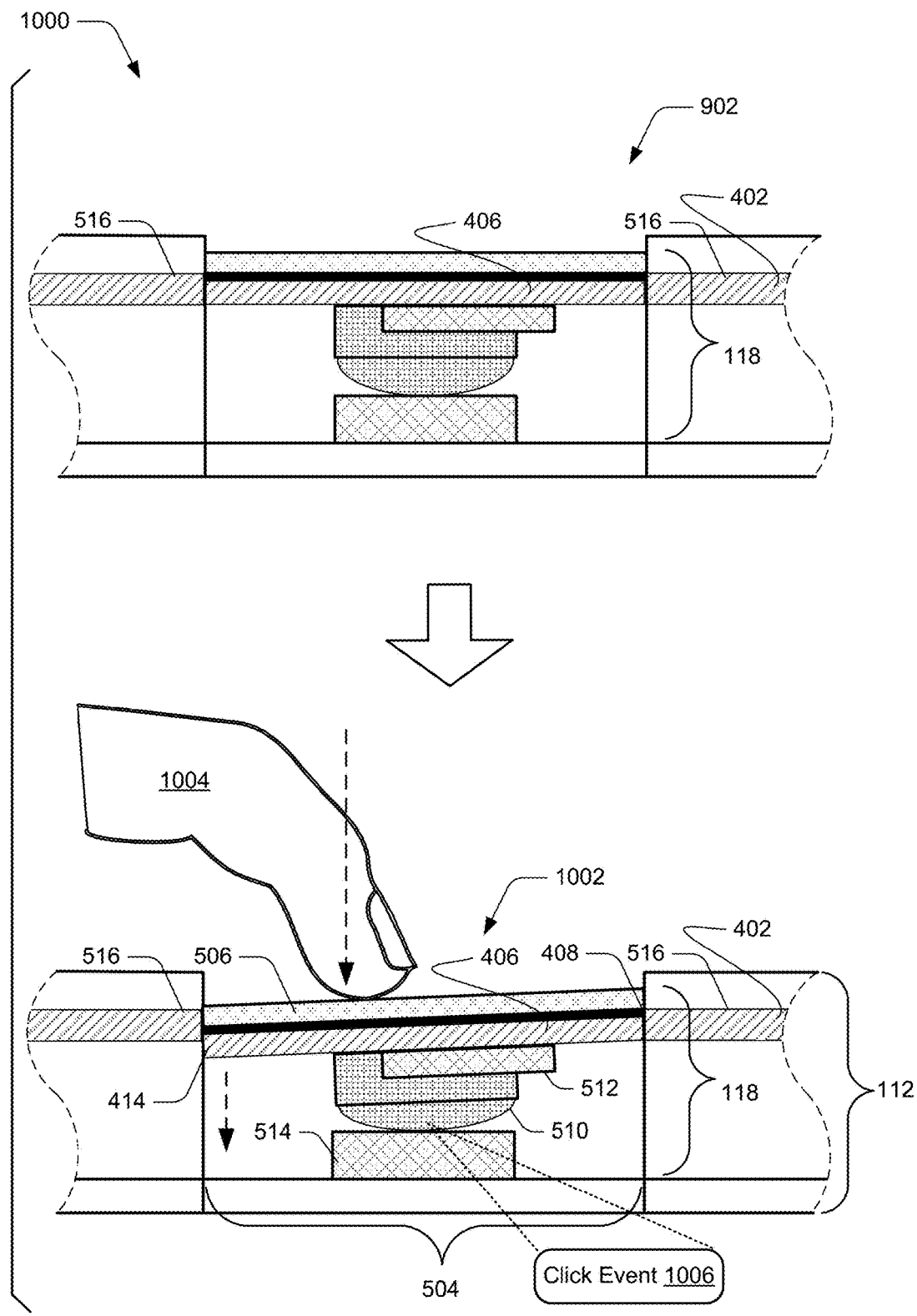
FIG. 10 illustrates an example implementation scenario for interacting with a touch input device in accordance with one or more embodiments.

FIG. 10 illustrates an example implementation scenario 1000 for interacting with the touch input device 118 in accordance with one or more implementations. In at least some implementations, the scenario 1000 represents a side view perspective of the scenario 700 discussed above. The upper portion of the scenario 1000 includes the side section view 902 of the input device 104 introduced above with reference to FIG. 9, and various components of the touch input device 118 introduced above.

Proceeding to the lower portion of the scenario 1000, a user provides a touch interaction 1002 to the touch input device 118 via a finger 1004. The user, for instance, applies downward force to the face sheet 506. Pressure from the touch interaction 1002 applies pressure to components of the touch input device 118 and thus the touch input device 118 moves downward within the mounting cavity 504. In this particular example, movement of the touch input device 118 pivots on the hinge region 408 of the circuit board 402, introduced above with reference to FIG. 4*a*.

Further illustrated is that during movement of the touch input device 118 in response to the touch interaction 1002, the third side 414 of the touch interaction region 406 moves downward within the mounting cavity 504. As discussed herein, the third side 414 may be cut and/or etched from the adjacent portions 516 of the circuit board 402 to enable movement of the touch interaction region 406.

Further to the scenario 1000, movement of the touch input device 118 compresses the switch 510 against the switch step 514 to actuate the switch 510 and generate a click event 1006. For instance, compressing the switch 510 past a threshold compression distance within the mounting cavity 504 causes the switch 510 to generate the click event 1006. In at least some implementations, the click event 1006 represents an instance of the click event 706 detailed above. Accordingly, details of the click event 706 discussed above may equally apply to the click event 1006.

As illustrated in the upper portion of the scenario 1000, in a resting (e.g., default) position, the touch interaction region 406 of the circuit board 402 is coplanar with the adjacent portions 516 of the circuit board 402. However, in response to the touch interaction 1002, the touch interaction region 406 deflects downward within the mounting cavity 504 such that the touch interaction region 406 is no longer coplanar with the adjacent portions 516. Thus, the scenario 1000 illustrates that the touch input device 118 is moveably connected to the circuit board 402 across the hinge region 408 such that in response to the touch interaction 1002, the touch input device 118 pivots about the hinge region 408 to enable the switch 510 to be actuated to generate the click event 1006. In at least some implementations, the position of the touch interaction region 406 illustrated in FIG. 10 represents the position illustrated in FIG. 4c.

Similarly to the scenario 800 detailed above, when the user lifts the finger 1004 to release the touch input device 118, pressure from the switch 510 pushes the touch input device 118 upward within the mounting cavity 504 to return the touch input device 118 to a resting default position, such as displayed in the upper portion of the scenario 1000.

Figure 11:
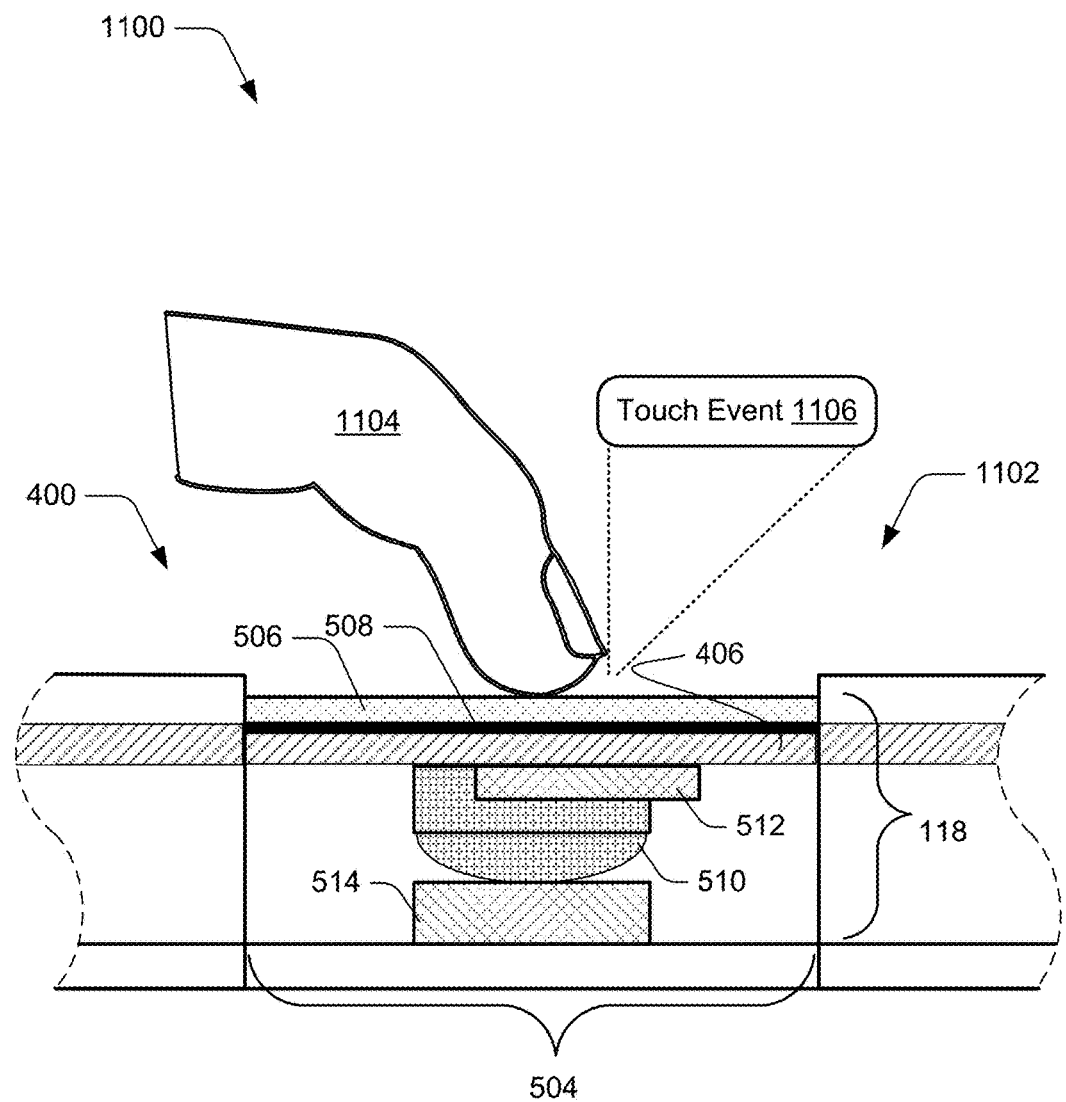
FIG. 11 illustrates an example implementation scenario for interacting with a touch input device in accordance with one or more embodiments.

FIG. 11 illustrates an example implementation scenario 1100 for interacting with the touch input device 118 in accordance with one or more implementations. The scenario 1100 includes the side section view 1102 of the input device 104 and various components of the touch input device 118 introduced above.

In the scenario 1100, a user provides a touch interaction 1102 to the touch input device 118 via a finger 1104. The user, for instance, applies downward force to the face sheet 506. However, in the scenario 1100, the force applied by the user as part of the touch interaction 1102 does not exceed a threshold force that causes the switch 510 to compress and generate a click event, such as discussed above with reference to the scenarios 700, 1000.

For instance, in the scenario 1100, the user rests the finger 1104 on the face sheet 506 and moves the finger 1104 around while maintaining contact with the face sheet 506. Accordingly, the sensor substrate 508 detects the touch interaction 1102 and generates a touch event 1106. In at least some implementations, the sensor substrate 508 includes capacitive and/or resistive touch sensors that detect the touch interaction 1102. Optical touch detection may also be used.

Generally, the touch event 1106 corresponds to an input event that is generated when touch input is received via the sensor substrate 508. For example, when a user provides a touch interaction to the face sheet 506 that exceeds a threshold downward force such that the switch 510 is actuated (e.g., the touch input 702), a click event is generated such as discussed above with reference to FIG. 7. However, if a touch interaction does not exceed the threshold downward force such that the switch 510 is actuated (e.g., as in the touch interaction 1102), the touch event 1106 is generated. In at least some implementations, the touch event 1106 is interpreted as a different type of input event than the click event 706 introduced above. For instance, the click event 706 may be utilized for object selection, and the touch event 1106 may be utilized for object movement. The touch event 1106, for example, may cause movement of a cursor and/or other icon on a display region, such as on the display 110 of the computing device 102.

Accordingly, the scenarios 700-1100 demonstrate example implementations where different interactions and different forces applied to the touch input device 118 generate different types of input events.

FIG. 12 illustrates the underside of the circuit board 402 with the stopper 512 and the switch 510 attached to the touch interaction region 406. In this particular implementation, the stopper 512 includes a notch 1200, and the switch 510 is positioned within the notch 1200. Utilizing the notch 1200, for instance, may conserve space within the touch interaction region 406. This is not intended to be limiting, however, and in at least some implementations the stopper 512 is not notched and the switch 510 is attached adjacent to the stopper 512. As discussed above, the stopper 512 is attached to the touch interaction region 406 but not to the adjacent regions 516 of the circuit board 402. Thus, the stopper 512 provides various functionality to the touch input device 118, such as component retention, component stiffening, and so forth.

Figure 13:
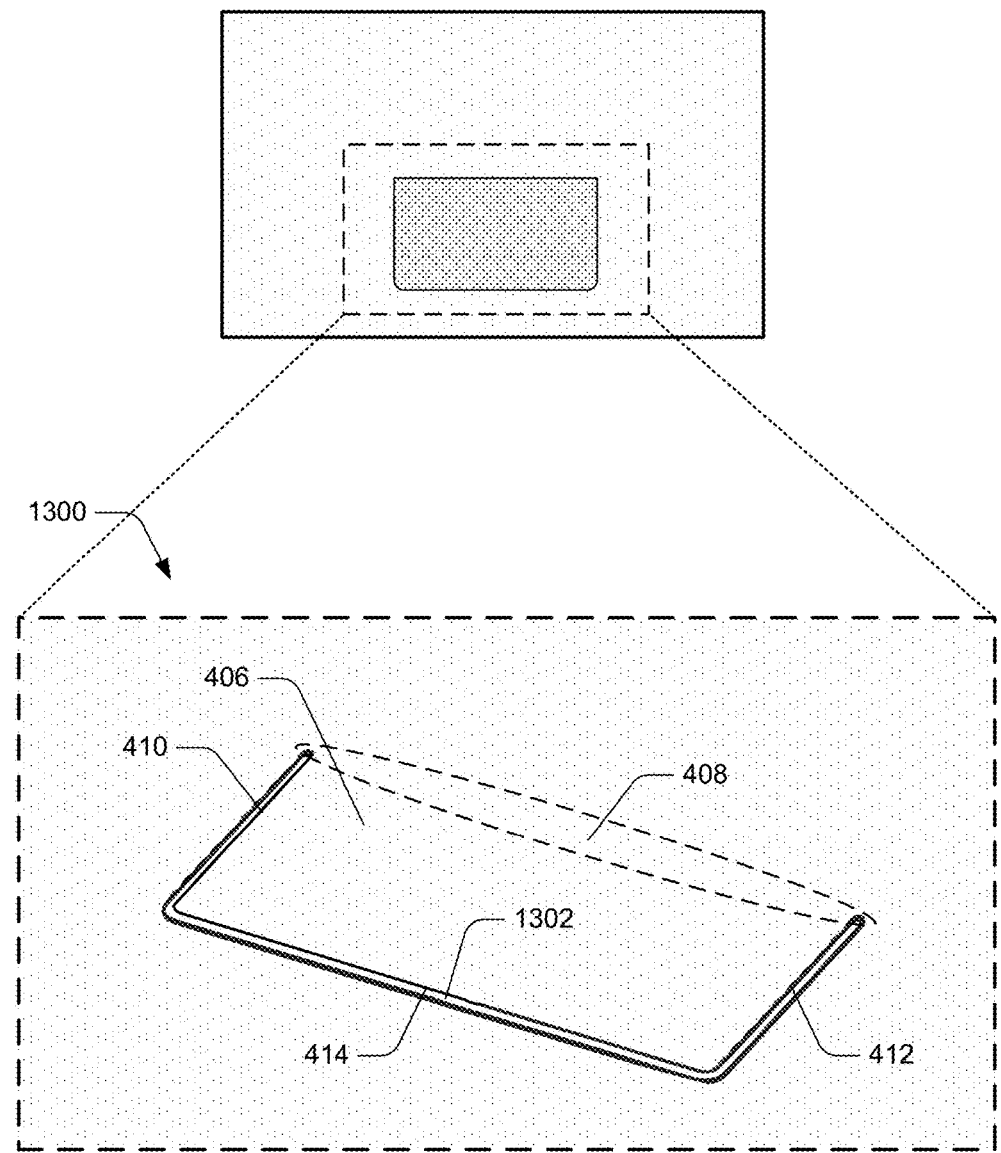
FIG. 13 depicts an example implementation of a touch interaction region of a touch input device in accordance with one or more embodiments.

FIG. 13 illustrates an example implementation 1300 of the touch interaction region 406 in accordance with one or more implementations. In the implementation 1300, a groove 1302 is cut around the first side 410, the second side 412, and the third side 414 of the touch interaction region 406. The groove 1302, for instance, represents a cut that passes completely through the thickness of the circuit board 402 along the length of the groove 1302. In at least some implementations, the groove 1302 represents a single continuous cut. Alternatively, the groove 1302 may be implemented as multiple cut portions separated by uncut portions, e.g., as intermittent perforations of the circuit board 402 along the length of the groove 1302.

In the implementation 1300, the hinge region 408 (generally shown within the dashed ellipse) is uncut and unetched such that the touch interaction region 406 pivots about the hinge region 408 in response to user interaction with the touch interaction region 406.

Figure 14:
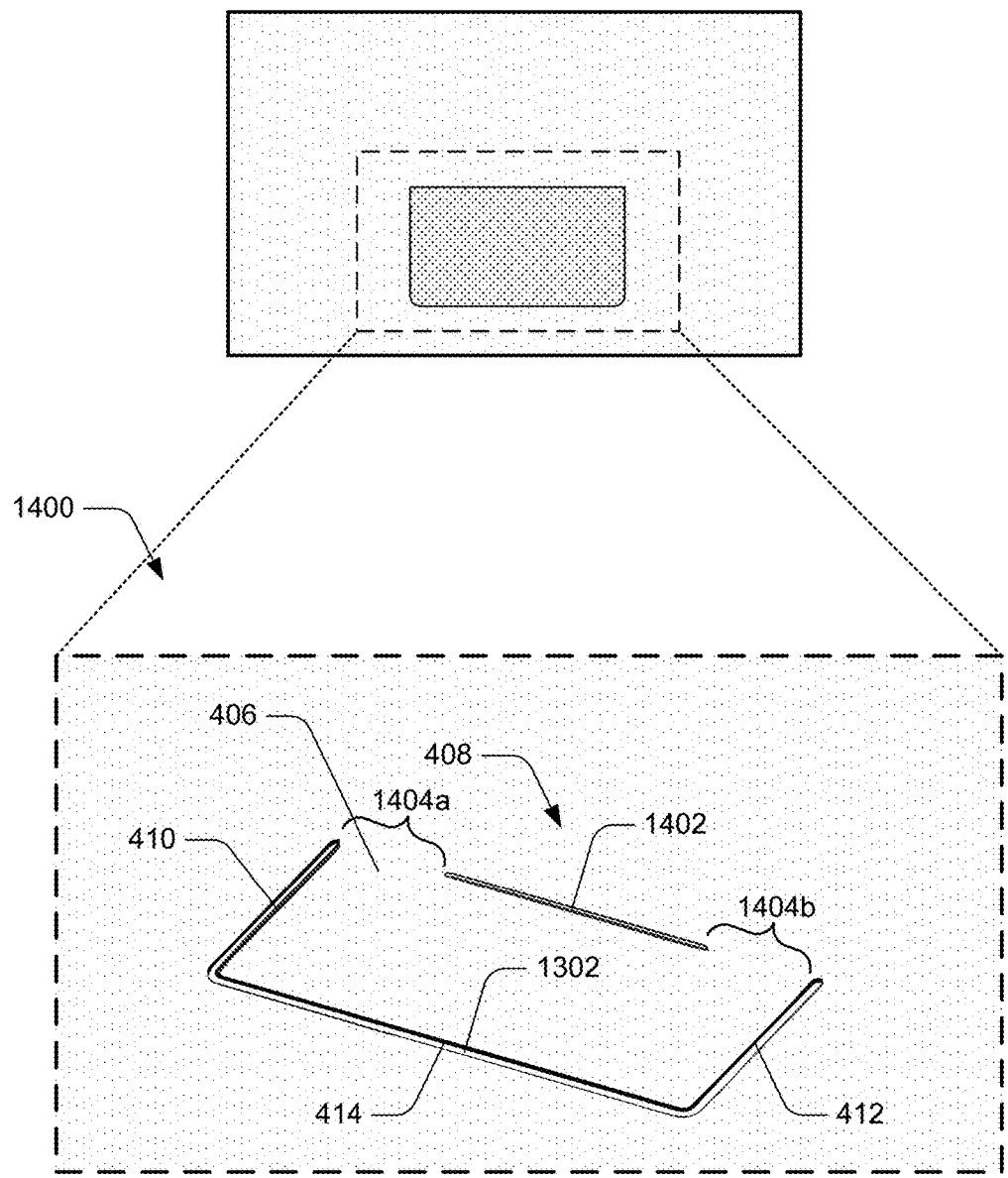
FIG. 14 depicts an example implementation of a touch interaction region of a touch input device in accordance with one or more embodiments.

FIG. 14 illustrates an example implementation 1400 of the touch interaction region 406 in accordance with one or more implementations. In the implementation 1400, the groove 1302 is cut around the first side 410, the second side 412, and the third side 414 of the touch interaction region 406. Example details concerning the groove 1302 are discussed above.

Further to the implementation 1400, the hinge region 408 includes a hinge groove 1402, a hinge beam 1404a, and a hinge beam 1404b. Generally, the hinge groove 1402 represents a groove that is cut and/or etched from the circuit board 402 along a portion of the hinge region 408. The hinge beams 1404a, 1404b represent portions of the hinge region 408 that are not cut or etched. Thus, during movement of the touch interaction region 406, the touch interaction region 406 pivots about the hinge beams 1404a, 1404b. The hinge beams 1404a, 1404b, for instance, represent hinge portions that connect the touch interaction region 406 to the main body of the circuit board 402.

As discussed herein, the term "etching" and its variations generally refer to removal of portions of a surface without a complete perforation of the surface. For instance, with reference to the circuit board 402, etching may be performed via removal of one or more layers of the circuit board 402. Generally, etching may be performed via any suitable etching and/or ablating technique, such as laser, chemical, heat, mechanical, and so forth. Further, etching may be performed on a top surface of the circuit board 402, a bottom surface of the circuit board 402, and/or a combination of both surfaces.

Figure 15:
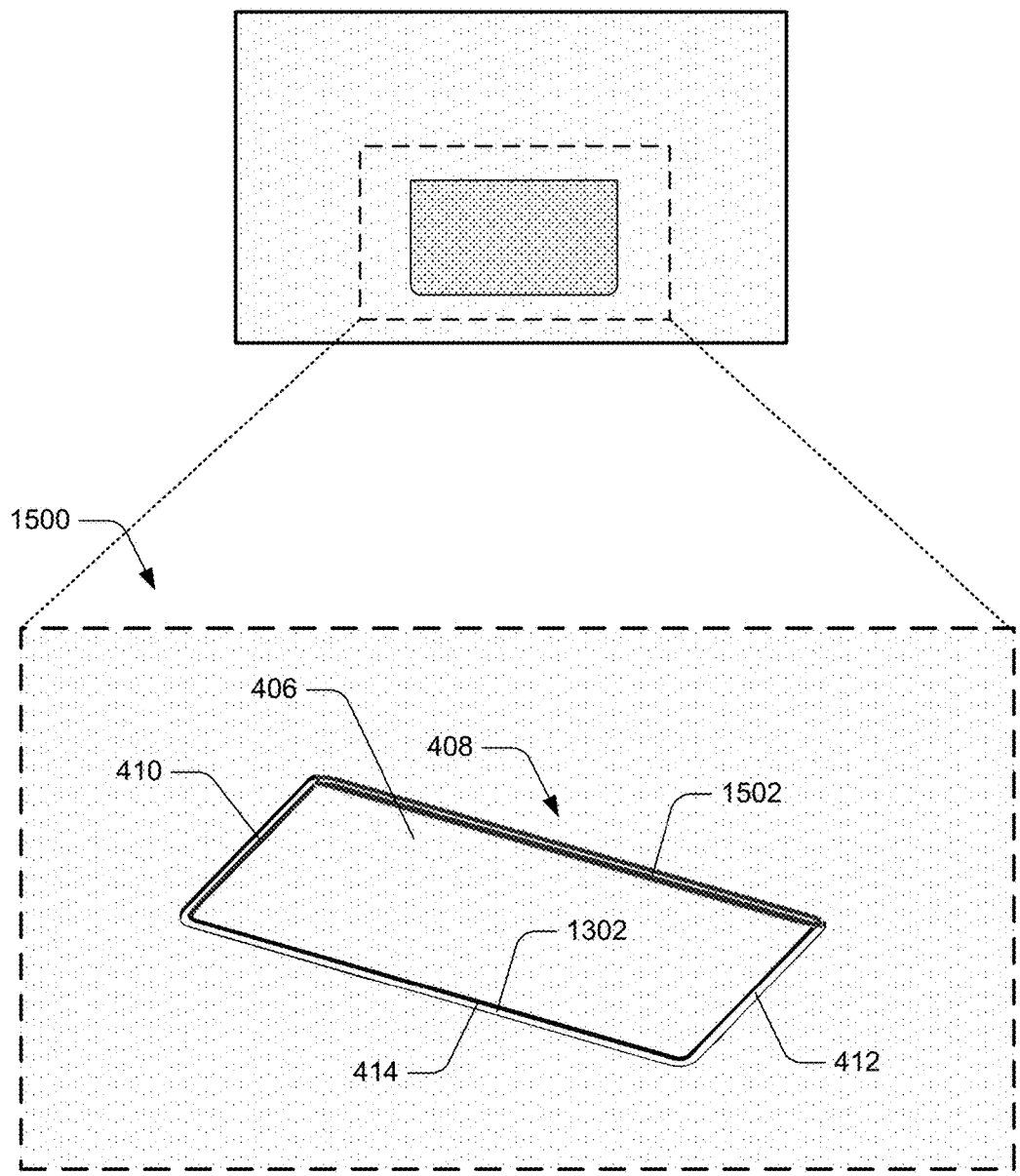
FIG. 15 depicts an example implementation of a touch interaction region of a touch input device in accordance with one or more embodiments.

FIG. 15 illustrates an example implementation 1500 of the touch interaction region 406 in accordance with one or more implementations. In the implementation 1500, the groove 1302 is cut or etched around the first side 410, the second side 412, and the third side 414 of the touch interaction region 406. Example details concerning the groove 1302 are discussed above.

Further to the implementation 1500, the hinge region 408 includes a hinge groove 1502 that represents a groove that is etched from the circuit board 402 along the hinge region 408. The hinge groove 1502, for instance, traverses the hinge region 408 between the first side 410 and the second side 412, e.g., the entire hinge region 408. According to various implementations, the hinge groove 1502 is partially etched through one or more layers from the top surface and/or the bottom surface of the circuit board 402, but does not completely perforate the circuit board 402. Thus, during movement of the touch interaction region 406, the touch interaction region 406 pivots about the hinge groove 1502.

Figure 16:
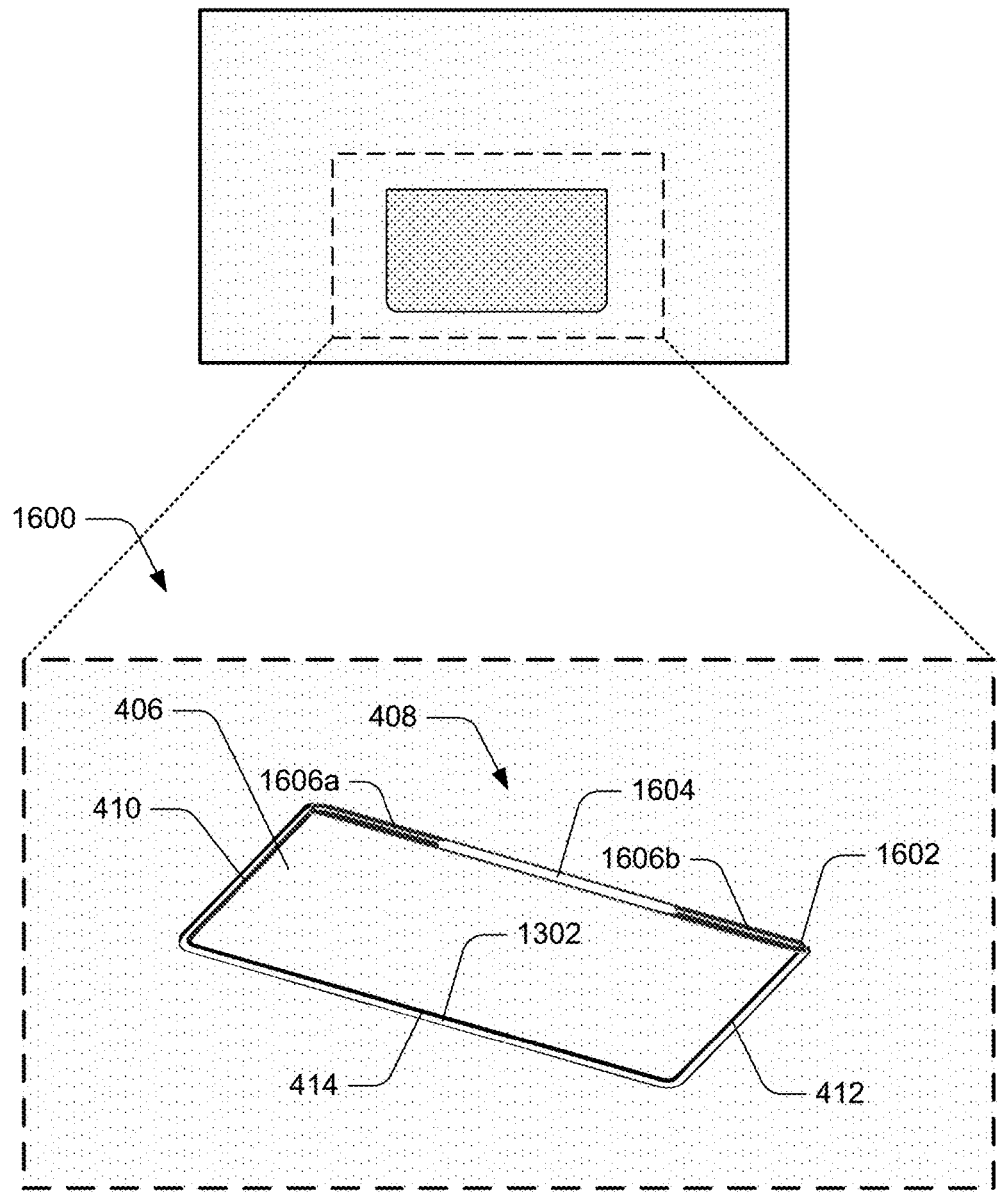
FIG. 16 depicts an example implementation of a touch interaction region of a touch input device in accordance with one or more embodiments.

FIG. 16 illustrates an example implementation 1600 of the touch interaction region 406 in accordance with one or more implementations. In the implementation 1600, the groove 1302 is cut or etched around the first side 410, the second side 412, and the third side 414 of the touch interaction region 406. Example details concerning the groove 1302 are discussed above.

Further to the implementation 1600, the hinge region 408 includes a hinge groove 1602 that represents a groove that is partially etched and partially cut from the circuit board 402 along the hinge region 408. The hinge groove 1602, for instance, traverses the hinge region 408 between the first side 410 and the second side 412, e.g., the entire hinge region 408. According to various implementations, the hinge groove 1602 includes a cut portion 1604 and etched portions 1606a, 1606b. Generally, the cut portion 1604 represents a portion of the hinge groove 1602 that perforates entirely through the thickness of the circuit board 402. The etched portions 1606a, 1606b represent portions of the circuit board 402 that are etched through one or more layers from the top surface and/or the bottom surface of the circuit board 402, but do not completely perforate the circuit board 402. Thus, during movement of the touch interaction region 406, the touch interaction region 406 pivots about the etched portions 1606a, 1606b.

In the example implementations discussed above, an electrical connection remains between the touch interaction region 406 and the main body of the circuit board 402 across the hinge region 408. The electrical connection enables electrical signal to be conducted from components attached to the touch interaction region 406 to other components, such as from the sensor substrate 508 and the switch 510 to a component of the input device 104 and/or the computing device 102.

Figure 17:
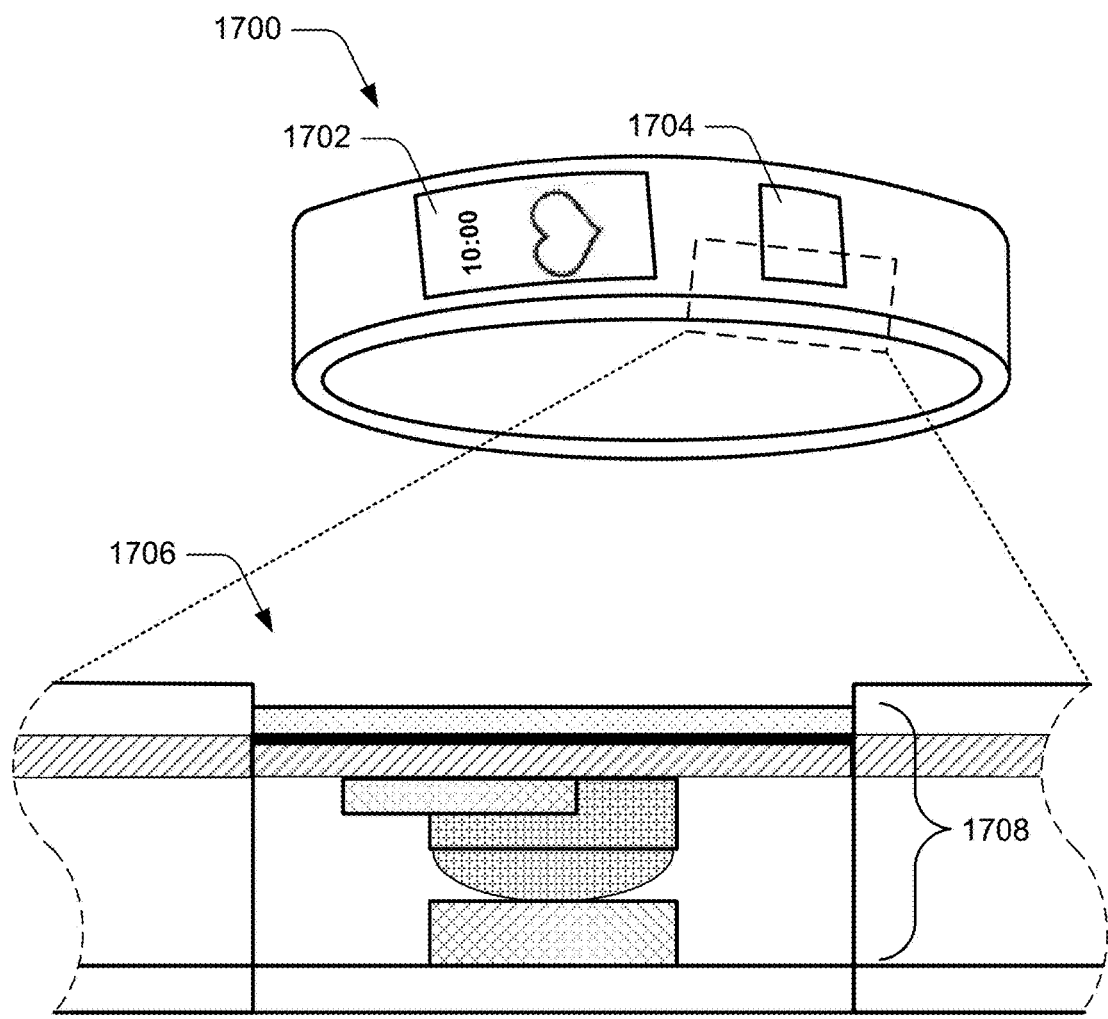
FIG. 17 depicts an example wearable device in accordance with one or more embodiments.

FIG. 17 illustrates an example wearable device 1700 according to one or more implementations. The wearable device 1700 includes a display 1702 and an input region 1704 on its outer surface. Generally, the display 1702 represents a display device that is configured to display various visual indicia. The input region 1704 corresponds to a portion of the wearable device 1700 to which input may be provided, such as touch-based input.

Further illustrated in FIG. 17 is a side cross-section view 1706 of the wearable device 1700. Generally, the cross-section view 1706 represents a cross-section of the wearable device beneath the input region 1704. Illustrated as part of the cross-section view 1706 is a touch input device 1708. According to various implementations, the touch input device 1708 represents an instance of the touch input device 118 described above. Accordingly, in one or more implementations, the various details and implementation variations described above with reference to the touch input device 118 also pertain to the touch input device 1708.

Although the wearable device 1700 is illustrated as a wrist-watch form factor, it is to be appreciated that implementations for a touch input in a circuit board described herein apply to a wide variety of different form factors, wearable and otherwise.

Figure 18:
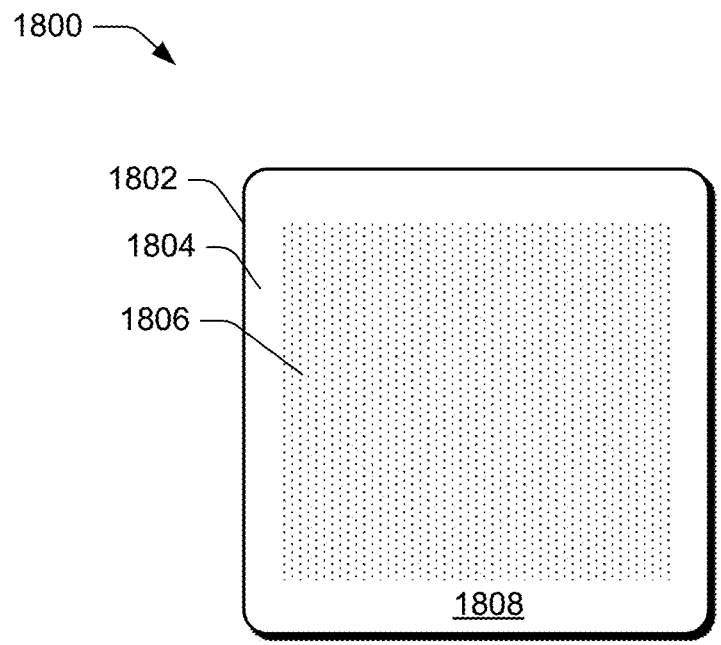
FIG. 18 depicts an example peripheral touch input device in accordance with one or more embodiments.

FIG. 18 illustrates an example peripheral touch input device 1800 in accordance with one or more implementations. The peripheral touch input device 1800 is representative of an external peripheral device that can be communicatively associated with various devices via a wired and/or wireless connection. For instance, the peripheral touch input device 1800 represents an external peripheral device that can be communicatively associated with a variety of different types of computing devices to provide touch input to the computing devices.

The peripheral touch input device 1800 includes a chassis 1802 with a bezel 1804 and a touch input region 1806. According to one or more implementations, the peripheral touch input device 1800 includes the various touch input device components and attributes discussed above. For instance, the peripheral touch input device 1800 includes the touch input device 118 within the chassis 1802 and beneath the touch input region 1806. Accordingly, the peripheral touch input device 1800 represents a portable touch input device that may be utilized in a variety of different scenarios to provide touch input to a computing device.

Figure 19:
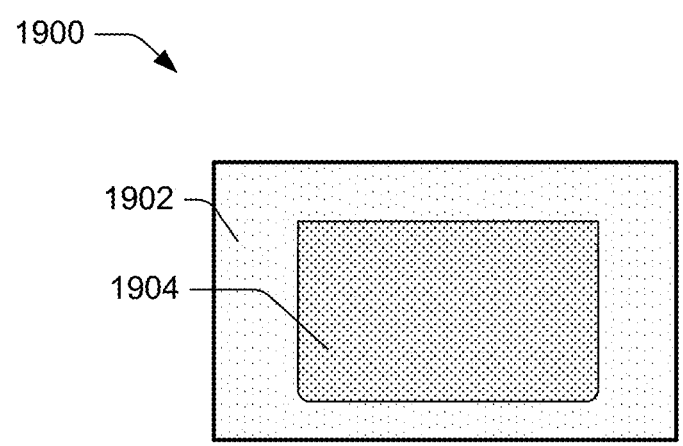
FIG. 19 depicts an example installable touch input device in accordance with one or more embodiments

FIG. 19 illustrates an installable touch input device 1900 in accordance with one or more implementations. The installable touch input device 1900 includes a circuit board 1902 and a touch input region 1904. Generally, the installable touch input device 1900 represents a touch input device that is installable in a variety of devices, such as various form factors of computing devices. For instance, the installable touch input device 1900 may be soldered onto a primary circuit board of an input device to provide touch input functionality to the input device. The installable touch input device 1900, for example, may be installed into a larger input device (e.g., a keyboard) and/or a computing device during a manufacturing process. Thus, the installable touch input device 1900 may be integrated into a wide variety of different devices to provide touch input functionality. According to various implementations, the installable touch input device 1900 includes an instance of the touch input device 118. For instance, the touch input region 1904 represents an implementation of the touch interaction region 406, and various components of the touch input device 118 discussed above are positioned relative to the touch interaction region 406 such as discussed in the various implementations presented above.

While the example implementations described above are discussed separately, it is to be appreciated that implementations described herein may be combined and interchanged to provide a variety of different implementations while remaining within the spirit and scope of the described and/or claimed implementations.

Further, while implementations are discussed with reference to a touchpad scenario, it is to be appreciated that the touch input device 118 along with other touch input devices presented herein may be implemented in a variety of ways, such as individual keys of a keyboard, input devices on various types of apparatus, and so forth. For instance, the touch input device 118 may be implemented as individual keys of the keyboard 116 of the input device 104.

Having discussed some example implementations for a touch input in a circuit board, consider now an example system and device in accordance with one or more implementations.

Example System and Device

Figure 20:
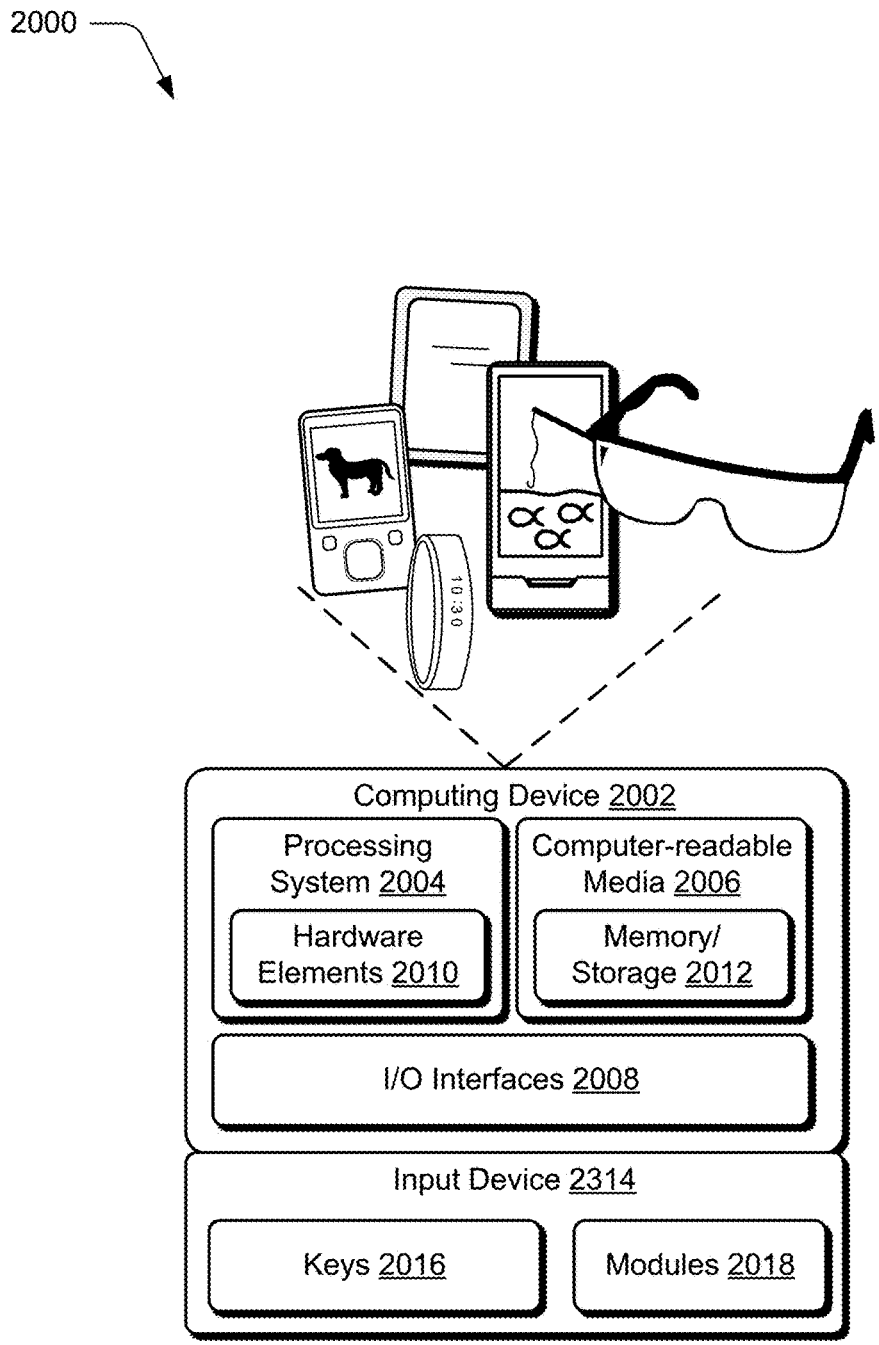
FIG. 20 illustrates an example system and device that can be employed to implement embodiments of the techniques described herein in accordance with one or more embodiments.

FIG. 20 illustrates an example system generally at 2000 that includes an example computing device 2002 that is representative of one or more computing systems and/or devices that may implement the various techniques described herein. In at least some implementations, the computing device 2002 represents an implementation of the computing device 102 discussed above. The computing device 2002 may be, for example, be configured to assume a mobile configuration through use of a housing formed and sized to be grasped and carried by one or more hands of a user, illustrated examples of which include a mobile phone, mobile game and music device, and tablet computer although other examples are also contemplated. In at least some implementations, the computing device 102 may be implemented as a wearable device, such as a smart watch, smart glasses, and so forth.

The example computing device 2002 as illustrated includes a processing system 2004, one or more computer-readable media 2006, and one or more I/O interface 2008 that are communicatively coupled, one to another. Although not shown, the computing device 2002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 2004 is representative of functionality to perform one or more operations using hardware. Accordingly, the processing system 2004 is illustrated as including hardware element 2010 that may be configured as processors, functional blocks, and so forth. This may include implementation in hardware as an application specific integrated circuit or other logic device formed using one or more semiconductors. The hardware elements 2010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 2006 is illustrated as including memory/storage 2012. The memory/storage 2012 represents memory/storage capacity associated with one or more computer-readable media. The memory/storage component 2012 may include volatile media (such as random access memory (RAM)) and/or nonvolatile media (such as read only memory (ROM), Flash memory, optical disks, magnetic disks, and so forth). The memory/storage component 2012 may include fixed media (e.g., RAM, ROM, a fixed hard drive, and so on) as well as removable media (e.g., Flash memory, a removable hard drive, an optical disc, and so forth). The computer-readable media 2006 may be configured in a variety of other ways as further described below.

Input/output interface(s) 2008 are representative of functionality to allow a user to enter commands and information to computing device 2002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 2002 may be configured in a variety of ways to support user interaction.

The computing device 2002 is further illustrated as being communicatively and physically coupled to an input device 2014 that is physically and communicatively removable from the computing device 2002. In this way, a variety of different input devices may be coupled to the computing device 2002 having a wide variety of configurations to support a wide variety of functionality. In this example, the input device 2014 includes one or more keys 2016, which may be configured as pressure sensitive keys, mechanically switched keys, and so forth.

The input device 2014 is further illustrated as include one or more modules 2018 that may be configured to support a variety of functionality. The one or more modules 2018, for instance, may be configured to process analog and/or digital signals received from the keys 2016 to determine whether a keystroke was intended, determine whether an input is indicative of resting pressure, support authentication of the input device 2014 for operation with the computing device 2002, and so on.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 2002. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media does not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 2002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 2010 and computer-readable media 2006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 2010. The computing device 2002 may be configured to implement particular instructions and/or functions corresponding to the software and/or hardware modules. Accordingly, implementation of a module that is executable by the computing device 2002 as software may be achieved at least partially in hardware, e.g., through use of computer-readable storage media and/or hardware elements 2010 of the processing system 2004. The instructions and/or functions may be executable/operable by one or more articles of manufacture (for example, one or more computing devices 2002 and/or processing systems 2004) to implement techniques, modules, and examples described herein.

Example implementations discussed herein include:

1. An input device including: a chassis with a circuit board mounted therein; and a touch input device including: a touch interaction region formed from a portion of the circuit board that is at least one of cut or etched from a main body of the circuit board such that the touch interaction region is moveable with respect to surrounding portions of the circuit board; and a switch that is positioned relative to the touch interaction region such that the switch is actuatable to generate a click input event in response to movement of the touch interaction region.

2. The input device of example 1, wherein the touch interaction region includes a sensor substrate that is configured to receive touch input to generate a touch input event.

3. The input device of any of preceding examples 1 or 2, wherein the circuit board includes at least one other input device separate from the touch input device.

4. The input device of any of preceding examples 1-3, wherein the touch interaction region includes a hinge region that connects the touch interaction region to the main body of the circuit board, and wherein the touch interaction region is moveable about the hinge region.

5. The input device of any of preceding examples 1-4, wherein the touch interaction region includes a hinge region that is at least partially cut or etched between the touch interaction region and the main body of the circuit board, and wherein the touch interaction region is moveable about the hinge region.

6. The input device of any of preceding examples 1-5, wherein the touch interaction region includes a hinge region that connects the touch interaction region to the main body of the circuit board such that the touch interaction region is moveable about the hinge region, and wherein the circuit board includes electrical connectivity from the touch interaction region to the main body of the circuit board across the hinge region.

7. The input device of any of preceding examples 1-6, wherein the touch interaction region is one or more of cut or etched on a first side, a second side, and a third side such that the touch interaction region is moveable about a fourth side of the touch interaction region.

8. The input device of any of preceding examples 1-7, wherein the touch interaction device includes a stopper that is connected to the touch interaction region and that constrains movement of the touch interaction region with respect to the main body of the circuit board.

9. The input device of any of preceding examples 1-8, wherein the touch input device includes a stopper that is connected to the touch interaction region and that provides stiffening of the touch interaction region during movement of the touch interaction region.

10. An apparatus including: a circuit board; and a touch input sensor including: a touch interaction region formed from a portion of the circuit board that is at least partially cut from a main body of the circuit board such that the touch interaction region is pivotable on a hinge region of the circuit board; and a switch that is positioned relative to the touch interaction region such that the switch is actuatable to generate a click input event in response to movement of the touch interaction region about the hinge region.

11. The apparatus of example 10, wherein the apparatus includes an input device operably attachable to a computing device.

12. The apparatus of any of preceding examples 10 or 11, wherein the apparatus includes a wearable device.

13. The apparatus of any of preceding examples 10-12, wherein the apparatus includes a modular touch input device.

14. The apparatus of any of preceding examples 10-13, wherein the PCBA includes at least one other input device separate from the touch input sensor.

15. The apparatus of any of preceding examples 10-14, wherein the touch interaction region includes a sensor substrate configured to receive touch input to generate a touch input event.

16. A touch input device including: a touch interaction region that is at least one of partially cut or etched from a portion of a circuit board such that the touch interaction region is moveable with respect to an adjacent portion of the circuit board; a hinge region that corresponds to a portion of the circuit board about which the touch interaction region is pivotable; and a switch that is positioned relative to the touch interaction region such that the switch is actuatable to generate a click input event in response to movement of the touch interaction region about the hinge region.

17. The touch input device of example 16, wherein the hinge region is at least one of etched or partially cut between the touch interaction region and the adjacent portion of the circuit board.

18. The touch input device of any of preceding examples 16 or 17, wherein the touch interaction region includes a sensor substrate configured to receive touch input.

19. The touch input device of any of preceding examples 16-18, further including a face sheet adhered to the touch interaction region.

20. The touch input device of any of preceding examples 16-19, wherein the switch is electrically connected to the touch interaction region such that the click input event that is communicated across the hinge region to a main body of the circuit board.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. An input device comprising:
a chassis with a circuit board mounted therein; and
a touch input portion including:
   a touch interaction region formed from a portion of the circuit board that is at least one of cut or etched from a main body of the circuit board such that the touch interaction region is moveable with respect to surrounding portions of the circuit board; and
   a switch that is positioned relative to the touch interaction region such that the switch is actuatable to generate a click input event in response to detecting a movement of the touch interaction region.

2. An input device as recited in claim 1, wherein the touch interaction region includes a sensor substrate that is configured to receive touch input to generate a touch input event.

3. An input device as recited in claim 1, wherein the movement of the touch interaction region causes the touch interaction region to compress the switch to generate the click event.

4. An input device as recited in claim 1, wherein the touch interaction region includes a hinge region that connects the touch interaction region to the main body of the circuit board, and wherein the touch interaction region is moveable about the hinge region.

5. An input device as recited in claim 1, wherein the touch interaction region includes a hinge region that is at least partially cut or etched between the touch interaction region and the main body of the circuit board, and wherein the touch interaction region is moveable about the hinge region.

6. An input device as recited in claim 1, wherein the touch interaction region includes a hinge region that connects the touch interaction region to the main body of the circuit board such that the touch interaction region is moveable about the hinge region, and wherein the circuit board includes electrical connectivity from the touch interaction region to the main body of the circuit board across the hinge region.

7. An input device as recited in claim 1, wherein the touch interaction region is one or more of cut or etched on a first side, a second side, and a third side such that the touch interaction region is moveable about a fourth side of the touch interaction region.

8. An input device as recited in claim 1, wherein the touch interaction device includes a stopper that is connected to the touch interaction region and that constrains movement of the touch interaction region with respect to the main body of the circuit board.

9. An input device as recited in claim 1, further comprising a stopper that is connected to the touch interaction region and that provides stiffening of the touch interaction region during movement of the touch interaction region.

10. An apparatus comprising:
a circuit board; and
a touch input sensor including:
   a touch interaction region formed from a portion of the circuit board that is at least partially cut from a main body of the circuit board such that the touch interaction region is pivotable on a hinge region of the circuit board; and
   a switch that is positioned relative to the touch interaction region such that the switch is actuatable to generate a click input event in response to detecting a movement of the touch interaction region about the hinge region.

11. An apparatus as recited in claim 10, wherein the apparatus comprises an input device operably attachable to a computing device.

12. An apparatus as recited in claim 10, wherein the apparatus comprises a wearable device.

13. An apparatus as recited in claim 10, wherein the movement of the touch interaction region causes the touch interaction region to compress the switch to generate the click event.

14. An apparatus as recited in claim 10, wherein the circuit board includes an input device separate from the touch input sensor.

15. An apparatus as recited in claim 10, wherein the touch interaction region includes a sensor substrate configured to receive touch input to generate a touch input event.

16. A touch input device comprising:
a touch interaction region that is at least one of partially cut or etched from a portion of a circuit board such that the touch interaction region is moveable with respect to an adjacent portion of the circuit board;
a hinge region that corresponds to a portion of the circuit board about which the touch interaction region is pivotable; and
a switch that is positioned relative to the touch interaction region such that the switch is actuatable to generate a click input event in response to detecting a movement of the touch interaction region about the hinge region.

17. A touch input device as described in claim 16, wherein the hinge region is at least one of etched or partially cut between the touch interaction region and the adjacent portion of the circuit board.

18. A touch input device as described in claim 16, wherein the touch interaction region includes a sensor substrate configured to receive touch input.

19. A touch input device as described in claim 16, wherein the movement of the touch interaction region causes the touch interaction region to compress the switch to generate the click event.

20. A touch input device as described in claim 16, wherein the switch is electrically connected to the touch interaction region such that the click input event that is communicated across the hinge region to a main body of the circuit board.

* * * * *